United States Patent
Eisenhuth et al.

(10) Patent No.: US 10,997,070 B1
(45) Date of Patent: May 4, 2021

(54) EFFICIENT SCRAMBLING AND ENCODING FOR COPYBACK PROCEDURES USING PRECOMPUTED VALUES

(71) Applicant: Micron Technology, Inc., Boise, ID (US)

(72) Inventors: Robert B. Eisenhuth, Boulder, CO (US); Jonathan S. Parry, Boise, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/730,830

(22) Filed: Dec. 30, 2019

(51) Int. Cl.
*G06F 12/02* (2006.01)
*G06F 12/04* (2006.01)

(52) U.S. Cl.
CPC .......... *G06F 12/04* (2013.01); *G06F 12/0238* (2013.01)

(58) Field of Classification Search
CPC .... G06F 3/0616; G06F 3/0619; G06F 3/0638; G06F 3/064; G06F 3/0647; G06F 3/0679; G06F 12/04; G06F 12/0238; G06F 2003/0695; G06F 2212/1036; G06F 2212/2022
USPC ................................ 711/103, 154, 165, 212
See application file for complete search history.

(56) References Cited

U.S. PATENT DOCUMENTS

| | | | | |
|---|---|---|---|---|
| 2012/0005409 A1* | 1/2012 | Yang | ................... | G06F 12/1408 711/103 |
| 2012/0265928 A1* | 10/2012 | Mun | ...................... | G11C 16/10 711/103 |
| 2014/0310534 A1* | 10/2014 | Gurgi | .................. | G06F 12/1408 713/193 |
| 2015/0121168 A1* | 4/2015 | Kim | ..................... | G06F 11/1435 714/764 |

* cited by examiner

*Primary Examiner* — Gary J Portka
(74) *Attorney, Agent, or Firm* — Nicholson De Vos; Webster & Elliott LLP

(57) ABSTRACT

A method for performing a copyback procedure is described. The method includes determining to move first encoded data from a first location in a memory die to a second location. In response to determining to move the first encoded data from the first location to the second location, a starting seed, which is associated with the first location, is combined with a destination seed, which is associated with the second location, to produce a combined seed. Based on the combined seed, the method determines a pseudorandom sequence based on the combined seed and a pseudorandom sequence table, wherein the pseudorandom sequence table maps seed values to pseudorandom sequences and the determined pseudorandom sequence maps to the combined seed in the pseudorandom sequence table. The method further combines the first encoded data with the pseudorandom sequence to produce second encoded data for storage in the second location.

20 Claims, 23 Drawing Sheets

| SEED 310A | SEED 310B | COMBINED SEED 310C | PSEUDORANDOM SEQUENCE 318 | FIRST ENCODED DATA 320A | SECOND ENCODED DATA 320B |
|---|---|---|---|---|---|
| 01100101 | 10001100 | 11101001 | 00110010 | 11001011 | 11111001 |

FIG. 4

| OLD FIELD VALUE 1302A | NEW FIELD VALUE 1302B | DIFFERENCE/ COMBINED FIELD VALUE 1302C | PADDED AND ENCODED FIELD VALUE 1308 | FIRST ENCODED DATA 320A | SECOND ENCODED DATA 320B |
|---|---|---|---|---|---|
| 01 | 00 | 01 | 00001010 | 11001011 | 11000001 |

FIG. 14

| FIELD VALUE 1302 | PADDED AND ENCODED FIELD VALUE 1308 |
|---|---|
| 00 | 00000011 |
| 01 | 00001010 |
| 10 | 00010001 |
| 11 | 00011000 |

EFFICIENT SCRAMBLING AND ENCODING FOR COPYBACK PROCEDURES USING PRECOMPUTED VALUES

TECHNICAL FIELD

The present disclosure generally relates to copyback procedures, and more specifically, relates to efficient scrambling and encoding for copyback procedures in a memory subsystem using precomputed values.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 illustrates a set of example values for a copyback procedure, in accordance with some embodiments of the present disclosure.

FIG. 14 illustrates another set of example values for a copyback procedure, in accordance with some embodiments of the present disclosure.

FIG. 15 shows a padding and encoding table, in accordance with some embodiments of the present disclosure.

DETAILED DESCRIPTION

Figure 1:
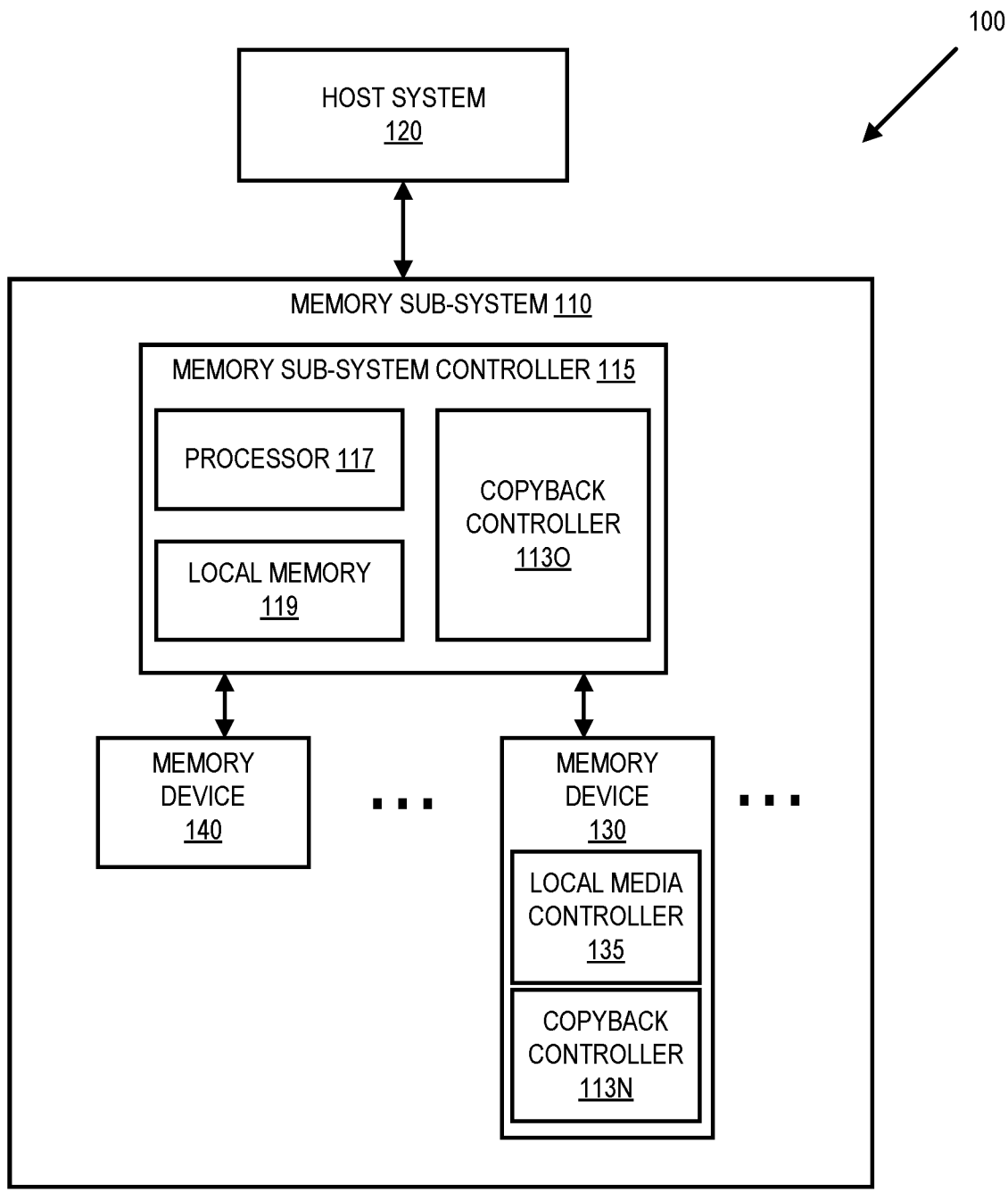
FIG. 1 illustrates an example computing system that includes a memory subsystem in accordance with some embodiments of the present disclosure.

Aspects of the present disclosure are directed to efficient scrambling and encoding for memory operations, including copyback procedures in a memory subsystem using precomputed values. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Memory subsystems can perform copyback procedures in which data is moved from one location/address in the memory subsystem to another location/address within the memory subsystem. A memory subsystem commonly performs copyback procedures without movement of data outside the memory devices of the memory subsystem (e.g., without transferring the data to a memory subsystem controller). By maintaining the data within the memory devices, the memory subsystem avoids expending time and power to transfer the data outside of the memory devices and then back into the memory devices for storage. Despite this desire to maintain the data completely within the memory devices during a copyback procedure, sometimes the data is scrambled or otherwise encoded based on a storage location of the data and movement of the data outside the memory devices is needed to facilitate encoding changes. For example, the memory subsystem could employ a scrambling technique to ensure data values are not repeated within the memory devices. In particular, in some types of memory (e.g., dynamic random-access memory (DRAM)), repeated unset cells (e.g., cells with the value of "0") in a particular row with consequent reads of these unset cells could cause charge to leak out of neighboring rows. This results in data errors and/or data loss. Further, in some types of memory (e.g., NAND) repeatedly setting the same cells (e.g., writing cells with the value of "1") could cause excessive wear to these cells as the memory subsystem is always applying the highest voltage to these cells.

To account for these potential issues, a memory subsystem controller performs a scrambling procedure based on seeds that are mapped to separate locations/addresses in the memory subsystem. Accordingly, during a copyback procedure where the location of data changes, the memory subsystem transfers the scrambled data from the memory devices to the memory subsystem controller. The memory subsystem controller descrambles the scrambled data using a first seed, which is mapped to the starting location of the data, scrambles the data using a second seed, which is mapped to the destination location, and writes the newly scrambled data to the destination location in the memory devices. The complexity of the scrambling procedure and the traditional memory subsystem configuration in which the memory subsystem controller controls scrambling of data necessitates the transfer of data between the memory devices and the memory subsystem controller to account for scrambling during a copyback procedure. The need for the memory subsystem to transfer data from the memory devices to the memory subsystem controller is increased when error correction coding (ECC) is applied to the scrambled data and/or when metadata within the data needs to be changed to reflect a new location of the data (e.g., a field value that indicates the address where the data is stored in the memory devices or is otherwise based on the address where the data is stored in the memory devices). Namely, the data needs to be (1) decoded using an ECC decoder and re-encoded using an ECC encoder and/or (2) adjusted to account for a changed field value before returning to the memory devices and written to the destination location. As noted above, this transfer of data between the memory devices and the memory subsystem controller adds significant delay, power consumption, and complexity to the copyback procedure.

Aspects of the present disclosure address the above and other deficiencies by accelerating scrambling and encoding for copyback procedures by exploiting properties of certain encoding techniques using precomputed values. In particular, some encoding functions possess the distributive property. The distributive property can be expressed as: if $Y1=F(X1)$ and $Y2=F(X2)$ then $Y1 \oplus Y2=F(X1 \oplus X2)$. Based on the distributive property, encoded data does not need to be decoded such that changes to the encoding and/or data being encoded can be made. Instead, the differences between the originally encoded data and the newly encoded data can be determined and these differences can be applied to the originally encoded data to produce the newly encoded data. For example, when the memory subsystem begins the transfer of encoded/scrambled data from a first location in the memory devices to a second location, the memory subsystem can determine a difference between a starting seed, which corresponds to the first location and is used to scramble the data in the first location, and a destination seed, which corresponds to the second location and is to be used to scramble the data for storage in the second location. In particular, the memory subsystem performs an exclusive-or with the starting seed and the destination seed to produce a combined/difference seed. The memory subsystem can use the combined seed to generate a pseudorandom sequence, which represents the difference between how the data is currently encoded in the first location and how the data should be encoded for storage in the second location. In particular, the memory subsystem can include a pseudorandom sequence table, which stores pseudorandom sequences mapped to seed values. In this configuration, the memory subsystem controller passes the pseudorandom sequence from the pseudorandom sequence table, which is determined using the combined seed, to the memory devices to exclusive-or the pseudorandom sequence with the currently encoded data. In the same fashion as described above in relation to scrambling data, the memory subsystem can utilize the distributive property, which relies on differences between starting and target data, for updating ECC and making changes to field values based on precomputed values that are stored in corresponding tables of the memory subsystem. Using this approach, time, power, and complexity devoted to (1) moving data between the memory devices and a memory subsystem controller, (2) computing values (e.g., pseudorandom sequences and/or ECC values), and (3) decoding/descrambling of data can be avoided.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor. The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes one or more copyback controllers 113O-113N that can efficiently perform copyback procedures by exploiting the distributive property of scrambling/encoding processes with the use of precomputed values. In some embodiments, the controller 115 includes at least a portion of the copyback controllers 113 (e.g., the copyback controller 113O). For example, the controller 115 can include an integrated circuit and/or a processor 117 (processing device) configured to execute instructions stored in local memory 119 for performing the operations described herein. In some embodiments, a copyback controller 113 is part of the host system 110, an application, or an operating system.

In some embodiments, the copyback controller 113O works in conjunction with one or more copyback controllers 113N in the memory devices 130 to perform a single copyback procedure. In particular, the copyback controller 113O can generate an encoded value, which represents changes to an original set of encoded data (e.g., user data, metadata, and/or parity bits). As used herein, encoding can include one or more of scrambling data, performing ECC encoding on the data, and/or altering data/metadata. The copyback controller 113O can pass the encoded value to a copyback controller 113N in the memory devices 130. Thereafter, the copyback controller 113A-113N in the memory devices 130 (i.e., a copyback controller 113 within a memory die) can apply the encoded/difference value to the original set of encoded data to generate a new set of encoded data such that the new set of encoded data can be copied/moved to a new location in the memory devices 130 to complete the copyback procedure.

As noted above, the copyback controller 113 can efficiently perform copyback procedures by exploiting the distributive property of scrambling/encoding processes with the use of precomputed values. Further details with regards to the operations of the copyback controller 113 are described below.

Figure 2:
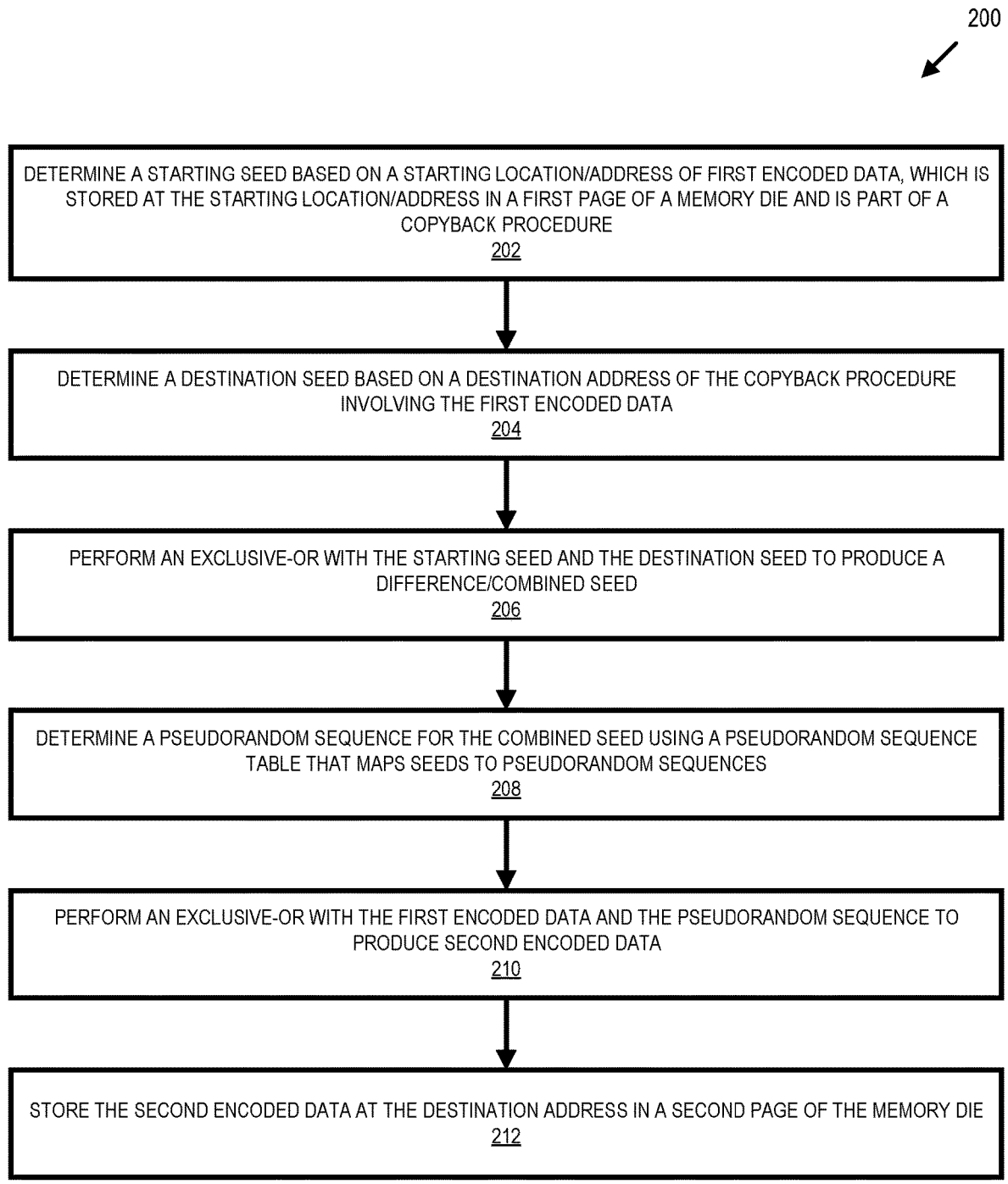
FIG. 2 is a flow diagram of a first example method to efficiently perform a copyback procedure in a memory subsystem using precomputed values, in accordance with some embodiments of the present disclosure.

FIG. 2 is a flow diagram of an example method 200 to efficiently perform a copyback procedure in a memory subsystem 110 using precomputed values, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by one or more copyback controllers 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 200 will be described in relation to the copyback system 300 shown in FIG. 3. Although described in relation to the copyback system 300, the processing device can perform the method 200 in relation to other systems. Accordingly, the use of the copyback system 300 is for illustrative purposes.

At operation 202, the processing device determines a starting seed 310A of first encoded data 320A, which is stored at a starting address 306A in a first page 304₁ in the memory subsystem 110. In particular, as described here in relation to the method 200 and shown in FIG. 3, the processing device is performing a copyback procedure to copy/move data (e.g., the user data represented by the first encoded data 320A) from a starting location (e.g., a location/address 306A in the NAND page 304₁) to a destination location (e.g., a location/address 306B in the NAND page 304₄). As shown, the processing device is performing a copyback procedure to copy/move data between pages 304 within the same NAND array 302 (sometimes referred to as a NAND block 302) and within the same memory die 324. However, in other embodiments, the processing device can perform a copyback procedure to copy/move data between NAND pages 304 of different NAND arrays 302 and/or different NAND dice 324. The processing device can perform the copyback procedure in furtherance of one or more objectives, including (1) garbage collection within the memory devices 130 or (2) moving data between portions of memory having different bit densities (e.g., from SLC to TLC or to QLC). As described herein, the data to be copied (e.g., the first encoded data 320A, which is represented by the bits $D0_1$-$D7_1$) has been scrambled. This scrambling includes applying a pseudorandom sequence to data (e.g., performing an exclusive-or with the data and the pseudorandom sequence) to generate the first encoded data 320A. The processing device selects the pseudorandom sequence based on the storage location of the first encoded data 320A. For example, as shown in FIG. 3, the seed selector 308 receives a starting address 306A, which corresponds to a location in the NAND array 302 where the first encoded data 320A is stored. The starting address 306A can be the address of the NAND page 304 where the first encoded data 320A is stored (e.g., the address of the NAND page 304₁) or a location within the NAND page 304 where the first encoded data 320A is stored. Based on the starting address 306A, the seed selector 308 indicates the seed 310A (sometimes referred to as the starting seed 310A), which corresponds to the seed 310 that was used to scramble/encode the first encoded data 320A. In some embodiments, the seed selector 308 is a one-to-one function that takes an address 306 as input (e.g., the starting address 306A) and outputs a seed 310 (e.g., the seed 310A), while in other embodiments, the seed selector 308 is a table that is indexed based on addresses 306. The processing device could use seeds 310 to generate corresponding pseudorandom sequences that are directly used to scramble and descramble data. However, as will be described below, the processing device ensures an accelerated and efficient procedure for scrambling data during a copyback procedure by taking into account a destination seed 310B corresponding to a destination location/address 306B along with the starting seed 310A corresponding to the starting location/address 306A.

At operation 204, the processing device determines the destination seed 310B based on the destination address 306B for the copyback procedure involving the first encoded data 320A. For example, as shown in FIG. 3, the seed selector 308 receives a destination address 306B, which corresponds to a location in the NAND array 302 that will be the destination of the copyback procedure. Similar to the starting address 306A, the destination address 306B is an address of a NAND page 304 (e.g., the address of the NAND page 304$_A$) or a location within a NAND page 304. Based on the destination address 306B, the seed selector 308 indicates the seed 310B (sometimes referred to as the destination seed 310B).

Figure 3:
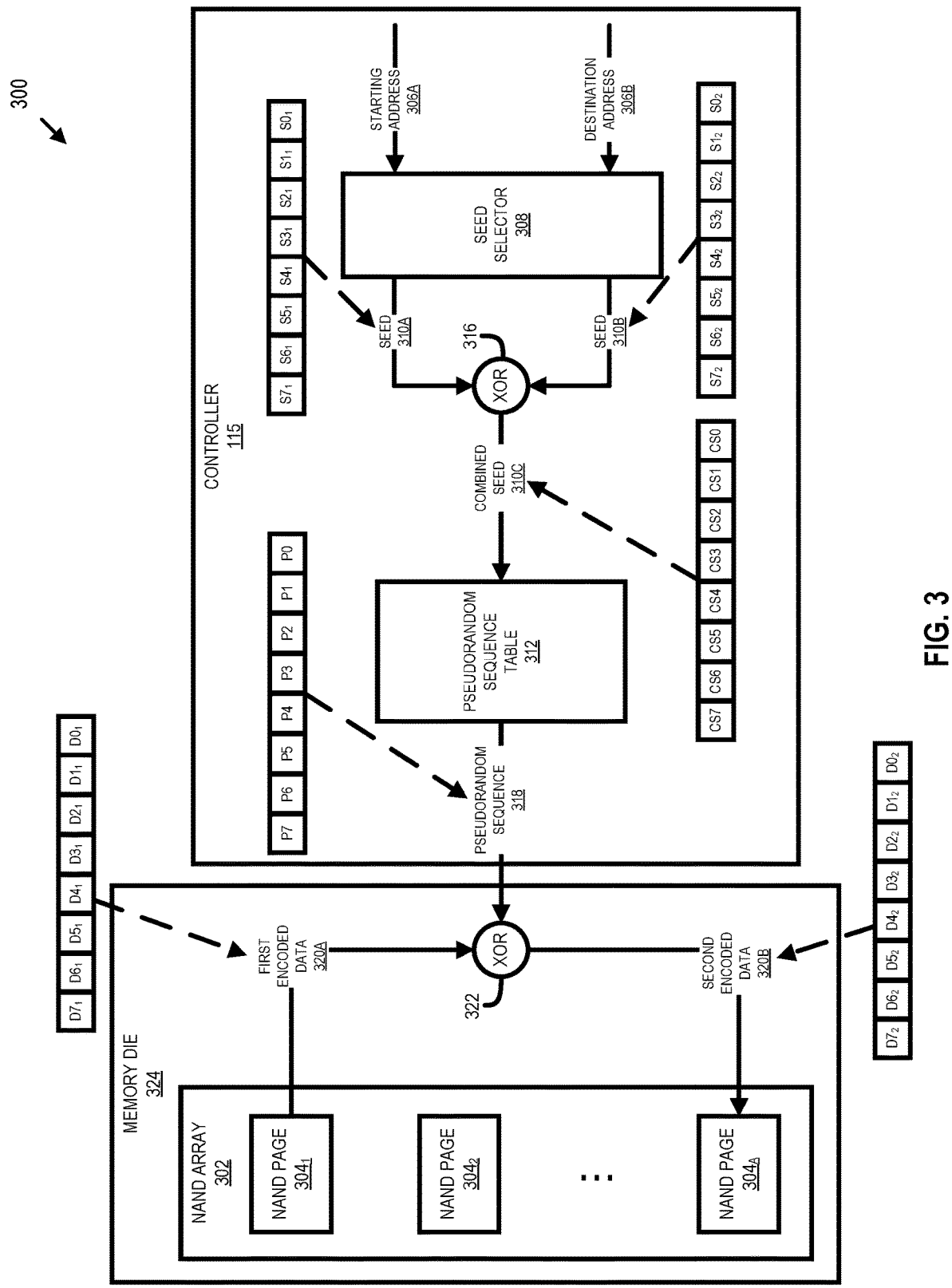
FIG. 3 shows a first example copyback system to perform a copyback procedure using precomputed values, in accordance with some embodiments of the present disclosure.

As shown in FIG. 3, the starting seed 310A is represented by eight bits $S0_1$-$S7_1$ and the destination seed 310B is represented by the eight bits $S0_2$-$S7_2$. In other embodiments, the seeds 310A and 310B can be any length (e.g., 16-20 bits in length). Accordingly, the use of the eight bits $S0_1$-$S7_1$ for the starting seed 310A and the eight bits $S0_2$-$S7_2$ for the destination seed 310B is for purposes of illustration.

FIG. 4 shows example values for the seed 310A and the seed 310B. As shown in FIG. 4, the seed 310A has the value "01100101" and the seed 310B has the value "10001100". These example values for the seed 310A and the seed 310B will be used to describe the method 200 below. However, it is understood that other values could be used.

At operation 206, the processing device combines the starting seed 310A and the destination seed 310B by performing an exclusive-or with the starting seed 310A and the destination seed 310B to generate a combined seed 310C (sometimes referred to as a difference seed 310C). For example, as shown in FIG. 3, the exclusive-or 316 takes the seed 310A and the seed 310B to generate the combined seed 310C. The combined seed 310C represents the difference between the seed 310A and the seed 310B. In particular, the combined seed 310C, which is represented by the eight bits CS0-CS7, is equal to $CSX = SX_1 \oplus SX_2$ for each value of X between 0 and 7. In the example shown in FIG. 4, the exclusive-or 316 processes the seed 310A with the value "01100101" and the seed 310B with the value "10001100" to produce the combined seed 310C with the value "11101001".

Although described throughout as the processing device combining values with an exclusive-or, the processing device can combine with any similar functions or techniques. For example, instead of using an exclusive-or function, the processing device can combine values using a set of NAND (not-AND) functions and/or XNOR (exclusive not-OR). For instance instead of the processing device combining the starting seed 310A with the destination seed 310B using an exclusive-or function at operation 206, the processing device can combine the starting seed 310A and the destination seed 310B at operation 206 according to the following: A XOR B=(starting seed NAND (starting seed NAND destination seed)) NAND (destination seed NAND (starting seed NAND destination seed)).

Figure 5:
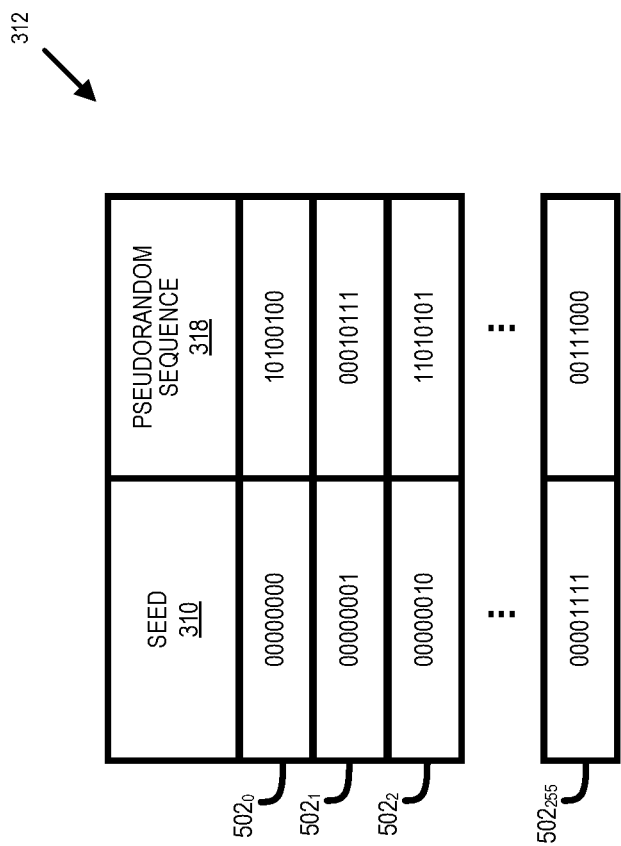
FIG. 5 shows a pseudorandom sequence table, in accordance with some embodiments of the present disclosure.

At operation 208, the processing device determines a pseudorandom sequence 318 based on the combined seed 310C using a pseudorandom sequence table 312. In this configuration, the pseudorandom sequence table 312 includes entries 502 that map seeds 310 to pseudorandom sequences 318. For example, FIG. 5 shows a pseudorandom sequence table 312, according to one example embodiment. As shown, the pseudorandom sequence table 312 includes a pseudorandom sequence 318 for each possible seed 310. In particular, as described above, seeds 310 are represented by eight bits (e.g., the starting seed 310A is represented by the eight bits $S0_1$-$S7_1$, the destination seed 310B is represented by the eight bits $S0_2$-$S7_2$, and the combined seed 310C is represented by the eight bits CS0-CS7. Accordingly, the pseudorandom sequence table 312 includes 256 entries $502_0$-$502_{255}$ that each include a pseudorandom sequence 318 for each of the 256 possible seeds 310, which can correspond to a starting seed 310A, a destination seed 310B, or a combined seed 310C. In this configuration, the memory subsystem 110 or some other device generates each of the pseudorandom sequences 318 prior to running the current copyback procedure (e.g., during design, manufacture, or installation of the memory subsystem 110). For example, during manufacture of the memory subsystem 110, a scrambler (e.g., a linear-feedback shift register (LFSR) scrambler) generates a pseudorandom sequence 318 for each of the 256 possible seeds 310 such that the pseudorandom sequence table 312 is generated and installed in the memory subsystem 110 during manufacture of the memory subsystem 110. As a result, the memory subsystem 110 does not need to include scrambling logic and/or does not need to utilize resources (e.g., power and time) for generating pseudorandom sequences 318 during performance of a copyback procedure.

Although shown as the seeds 310 being the same length as corresponding pseudorandom sequences 318, in other embodiments the pseudorandom sequences 318 can be longer in length than seeds 310. For example, while a seed can be 8-20 bits in length, a corresponding pseudorandom sequence 318 can be 256-1024 bits in length.

At operation 208, the processing device locates an entry 502 in the pseudorandom sequence table 312 that matches the combined seed 310C (i.e., an entry 502 that results in a hit using the combined seed 310C). The pseudorandom sequence 318 for this located entry 502 is the pseudorandom sequence 318 that the processing device determines at operation 208 and is represented by the bits P0-P7.

FIG. 4 shows an example value for the pseudorandom sequence 318. As shown in FIG. 4, the pseudorandom sequence 318 has the value "00110010". This example value for the pseudorandom sequence 318 will be used to describe the method 200 below. However, it is understood that other values could be used.

At operation 210, the processing device combines the pseudorandom sequence 318 and the first encoded data 320A by performing an exclusive-or with the pseudorandom sequence 318 and the first encoded data 320A to produce second encoded data 320B. For example, as shown in FIG. 3, the exclusive-or 322 takes the pseudorandom sequence 318 and the first encoded data 320A to produce the second encoded data 320B. In this configuration, while the first encoded data 320A, which is represented by the bits $D0_1$-$D7_1$, is scrambled using the seed 310A, the second encoded data 320B, which is represented by the bits $D0_2$-$D7_2$, is efficiently scrambled (e.g., reduced consumption of time and/or processing resources) using the seed 310B based on the combined seed 310C and corresponding pseudorandom sequence 318. In this fashion, the pseudorandom sequence 318 represents the differences between the first encoded data 320A and the second encoded data 320B, and the processing device uses the pseudorandom sequence 318 to alter the first encoded data 320A to arrive at the second encoded data 320B. As shown in the example data of FIG. 4, the exclusive-or 322 takes the pseudorandom sequence 318 with the value "00110010" and the first encoded data 320A with the value "11001011" to produce the second encoded data 320B with the value "11111001".

At operation 212, the processing device stores the second encoded data 320B at the destination address 306B in a second page 304. For example, the processing device stores the second encoded data 320B with the value "11111001" at the destination address 306B within the NAND page $304_A$ at operation 212.

Figure 6:
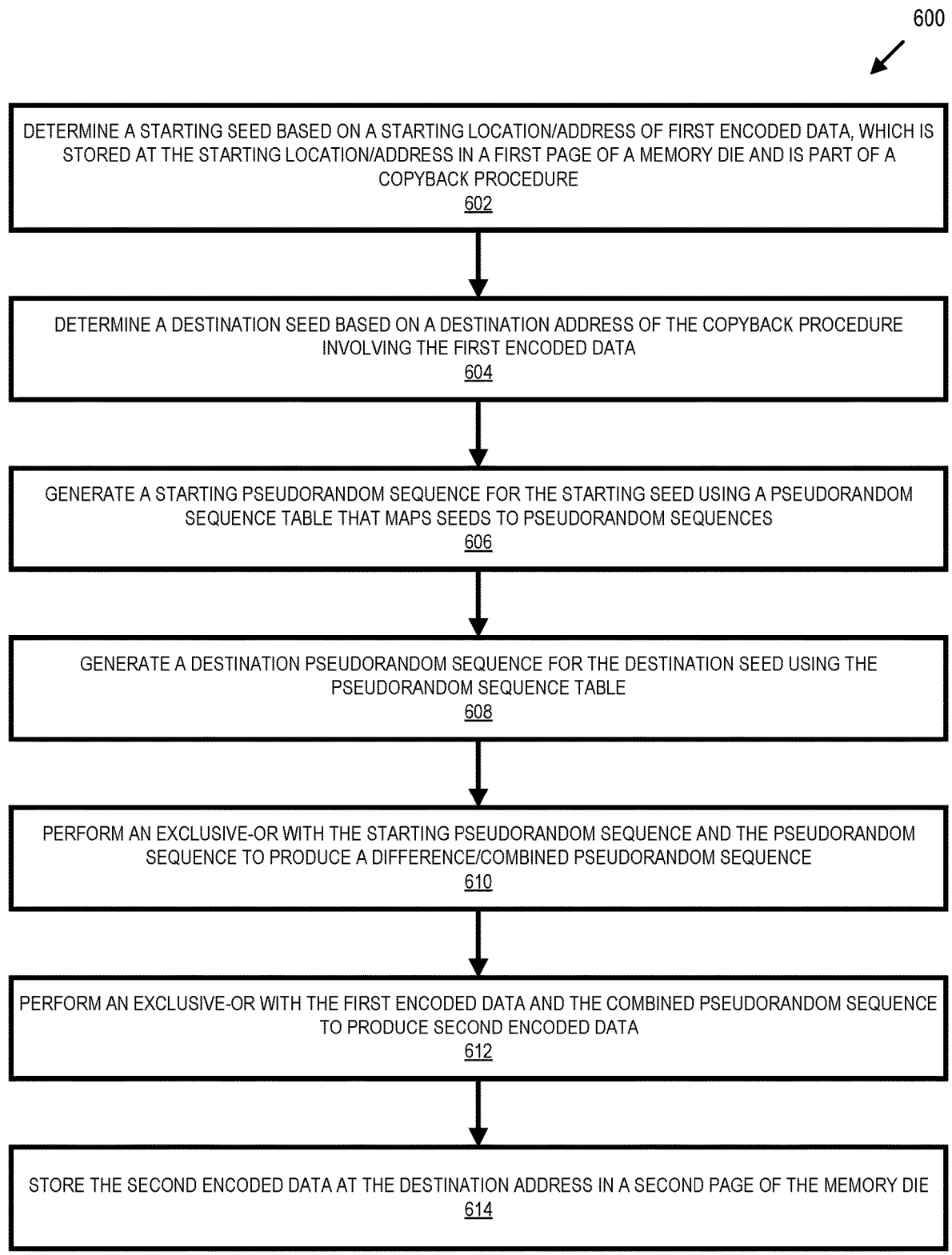
FIG. 6 is a flow diagram of a second example method to efficiently perform a copyback procedure in a memory subsystem using precomputed values, in accordance with some embodiments of the present disclosure.

Although described as the processing device using the combined seed 310C to generate the pseudorandom sequence 318, in some embodiments the processing device can generate pseudorandom sequences 318 for each of the starting seed 310A and the destination seed 310B using the pseudorandom sequence table 312 and combine these pseudorandom sequences 318 to generate a combined pseudorandom sequence 318. For example, FIG. 6 is a flow diagram of another example method 600 to efficiently perform a copyback procedure in a memory subsystem 110 using precomputed values, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by one or more copyback controllers 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 600 will be described in relation to the copyback system 700 shown in FIG. 7. Although described in relation to the copyback system 700, the processing device can perform the method 600 in relation to other systems. Accordingly, the use of the copyback system 700 is for illustrative purposes.

As shown in FIG. 6, the operations 602 and 604 can be performed in a similar or an identical manner as the operations 202 and 204 of the method 200. In this fashion, the processing device generates the starting seed 310A (represented by the bits $S0_1$-$S7_1$) based on the operation 602 and the destination seed 310B (represented by the bits $S0_2$-$S7_2$) based on the operation 604.

At operation 606, the processing device generates a starting pseudorandom sequence 318A based on the seed 310A and using the pseudorandom sequence table 312. In particular, similar to operation 208 of the method 200, the processing device locates an entry 502 in the pseudorandom sequence table 312 that matches the starting seed 310A (i.e., an entry 502 that results in a hit based on the starting seed 310A). The pseudorandom sequence 318 for this located entry 502 is the starting pseudorandom sequence 318A that the processing device determines at operation 606 and is represented by the bits $P0_1$-$P7_1$.

At operation 608, the processing device generates a destination pseudorandom sequence 318B based on the seed 310B and using the pseudorandom sequence table 312. In particular, similar to operation 606, the processing device locates an entry 502 in the pseudorandom sequence table 312 that matches the destination seed 310B (i.e., an entry 402 that results in a hit based on the destination seed 310B). The pseudorandom sequence 318 for this located entry 502 is the destination pseudorandom sequence 318B that the processing device determines at operation 608 and is represented by the bits $P0_2$-$P7_2$.

Although shown as a single pseudorandom sequence table 312, in some embodiments, the processing device can use two separate pseudorandom sequence tables 312 with identical entries 502. In this configuration, the processing device uses a first pseudorandom sequence table 312 to generate the starting pseudorandom sequence 318A based on the seed 310A and a second pseudorandom sequence table 312 to generate the destination pseudorandom sequence 318B based on the seed 310B.

At operation 610, the processing device combines the starting pseudorandom sequence 318A and the destination pseudorandom sequence 318B by performing an exclusive-or with the starting pseudorandom sequence 318A and the destination pseudorandom sequence 318B to generate a combined pseudorandom sequence 318C (sometimes referred to as a difference pseudorandom sequence 318C). For example, as shown in FIG. 7, the exclusive-or 702 takes the starting pseudorandom sequence 318A and the destination pseudorandom sequence 318B to generate the combined pseudorandom sequence 318C. The combined pseudorandom sequence 318C represents the difference between the starting pseudorandom sequence 318A and the destination pseudorandom sequence 318B. In particular, the combined pseudorandom sequence 318C, which is represented by the eight bits P0-P7, is equal to $PX=PX_1 \oplus PX_2$ for each value of X between 0 and 7.

At operation 612, the processing device combines the combined pseudorandom sequence 318C and the first encoded data 320A by performing an exclusive-or with the combined pseudorandom sequence 318C and the first encoded data 320A to produce second encoded data 320B. For example, as shown in FIG. 7, the exclusive-or 322 takes the combined pseudorandom sequence 318C and the first encoded data 320A to produce the second encoded data 320B. In this configuration, while the first encoded data 320A, which is represented by the bits $D0_1$-$D7_1$, is scrambled using the seed 310A, the second encoded data 320B, which is represented by the bits $D0_2$-$D7_2$, is efficiently scrambled e.g., reduced consumption of time and/or processing resources) using the seed 310B based on the pseudorandom sequences 318A-318C. In this fashion, the combined pseudorandom sequence 318C represents the differences between the first encoded data 320A and the second encoded data 320B and the processing device uses the combined pseudorandom sequence 318C to alter the first encoded data 320A to arrive at the second encoded data 320B.

At operation 614, the processing device stores the second encoded data 320B at the destination address 306B in a second page 304.

Figure 7:
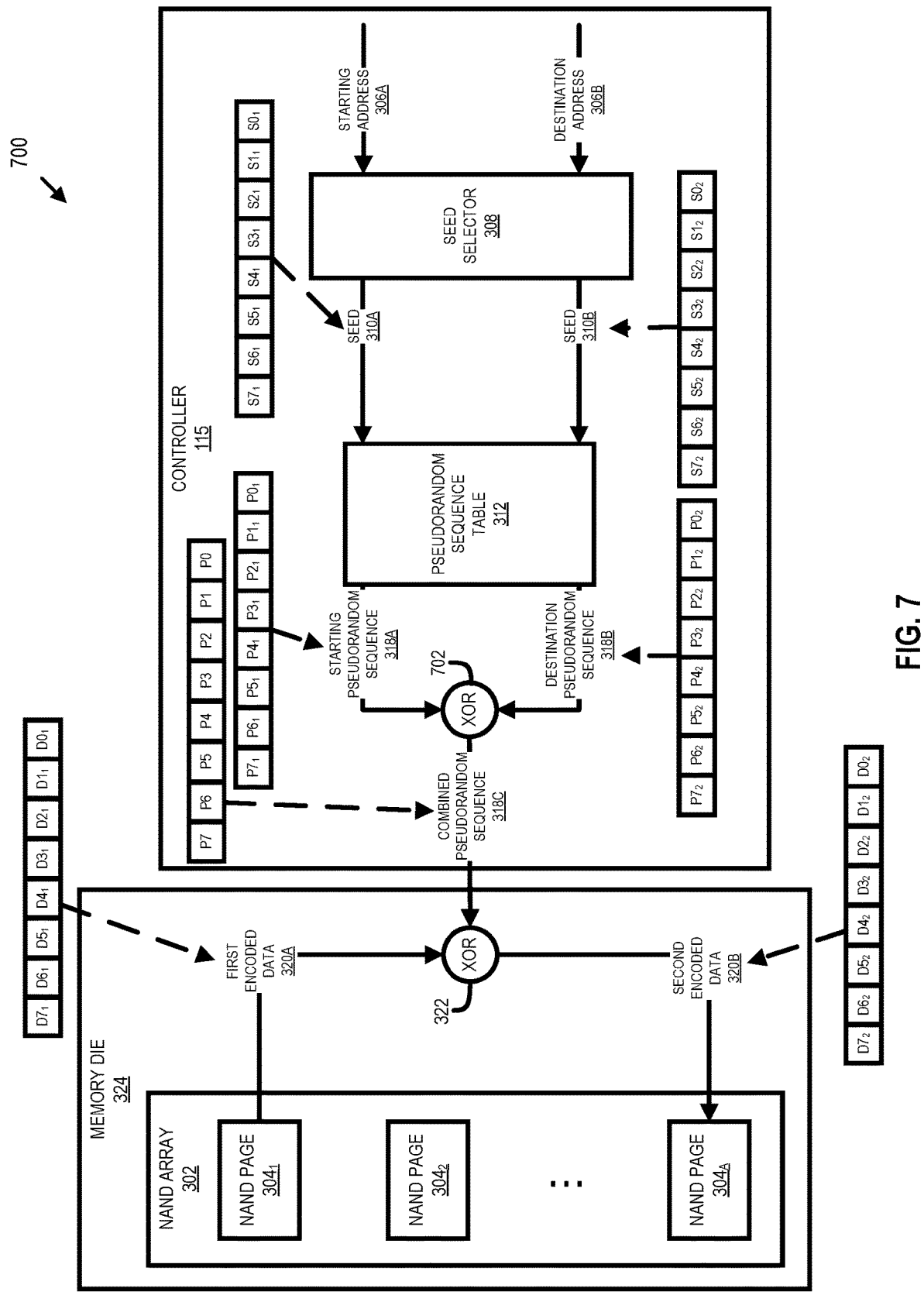
FIG. 7 illustrates a second example copyback system to perform a copyback procedure using precomputed values, in accordance with some embodiments of the present disclosure.

As shown in FIG. 3 and FIG. 7, the operations related to generation of the pseudorandom sequence 318 and the combined pseudorandom sequence 318C are performed in the controller 115, while the combination of the pseudorandom sequence 318 or the combined pseudorandom sequence 318C with the first encoded data 320A is performed in the memory die 324. Accordingly, the first encoded data 320A does not need to be transferred outside the memory die 324. In this fashion, time and power devoted to transferring the encoded data 320A outside the memory die 324 can be avoided. In some embodiments, one or more operations and/or logic shown as being performed in the controller 115 can be performed in the memory die 324. Accordingly, the distribution of operations and logic shown in FIG. 3 and FIG. 7 is the minimum distribution in relation to the operations of the memory die 324.

As described above, the methods 200 and 600 perform copyback procedures without (1) transferring the first encoded data 320A outside the memory die 324 and (2) descrambling/decoding the first encoded data 320A. Instead, the methods 200 and 600 exploit the distributive property of the scrambling process to avoid additional time, power, and complexity to (1) move data between the memory devices 130 and a controller 115 of the memory subsystem 110 and (2) decode/descramble data.

Further, by utilizing the pseudorandom sequence table 312, which maps precomputed pseudorandom sequences 318 to corresponding seeds 310, complexity, power consumption, and time devoted to repeatedly generating pseudorandom sequences 318 during a copyback procedure can be largely avoided (e.g., generating the pseudorandom sequence 318 does not rely on a complex scrambler logic (e.g., a linear-feedback shift register (LFSR) scrambler within the memory subsystem 110), as instead lookup logic can be utilized in place of scrambler logic). However, storing each pair of seed 310 and pseudorandom sequence 318 can be burdensome, including requiring large amounts of memory to store each possible pair. In particular, although a relatively small number of bits are devoted to seeds 310 in the above-described examples, seeds 310 can be represented by a larger number of bits with a corresponding large number of seeds 310 and associated and pseudorandom sequences 318 (e.g., sixteen bit seeds 310 correspond to 65,536 possible values for seeds 310 and associated pseudorandom sequences 318, which can be much longer in length than the seed 310 counterparts). To address the burdens of storing each pair of seed 310 and pseudorandom sequence 318, in some embodiments a subset of seeds 310 and corresponding pseudorandom sequences 318 can be stored in the pseudorandom sequence table 312 instead of the full breadth of seeds 310 that could be represented by the number of bits devoted to representing seeds 310. In this case, the remaining seeds 310 (i.e., the seeds 310 that are not represented in the pseudorandom sequence table 312) are not associated with a location in the memory devices 130 such that these seeds 310 will not be used when descrambling or scrambling encoded data 320.

For example, in the example described above where seeds 310 are represented by eight bits (e.g., the starting seed 310A is represented by the eight bits $S0_1$-$S7_1$ and the destination seed 310B is represented by the eight bits $S0_2$-$S7_2$), there can be 256 potential seeds 310 (i.e., $2^8$ seeds 310). Instead of utilizing 256 potential seeds 310, in some situations the memory subsystem 110 can accommodate scrambling requirements utilizing sixteen potential seeds 310 (i.e., only four bits are needed to represent seeds 310 as there are only sixteen ($2^4$) locations for data within the memory die 324). Thus, the pseudorandom sequence table 312 would include sixteen entries 502 that are a subset of the 256 entries $502_0$-$502_{255}$ from the pseudorandom sequence table 312 shown in FIG. 5. In this configuration, for purposes of the method 200 and the copyback system 300, not only do the starting seed 310A and the destination seed 310B need to be located in the subset of seeds 310 that are in the pseudorandom sequence table 312, but the combined seed 310C needs to be located in the subset of seeds 310 that are in the pseudorandom sequence table 312. To accomplish this, the subset of seeds 310 must be carefully chosen to achieve this property (i.e., a seed 310 produced by the combination of any two seeds 310 in the subset of seeds 310 is also a member of the subset of seeds 310), as described in greater detail below.

Figure 8:
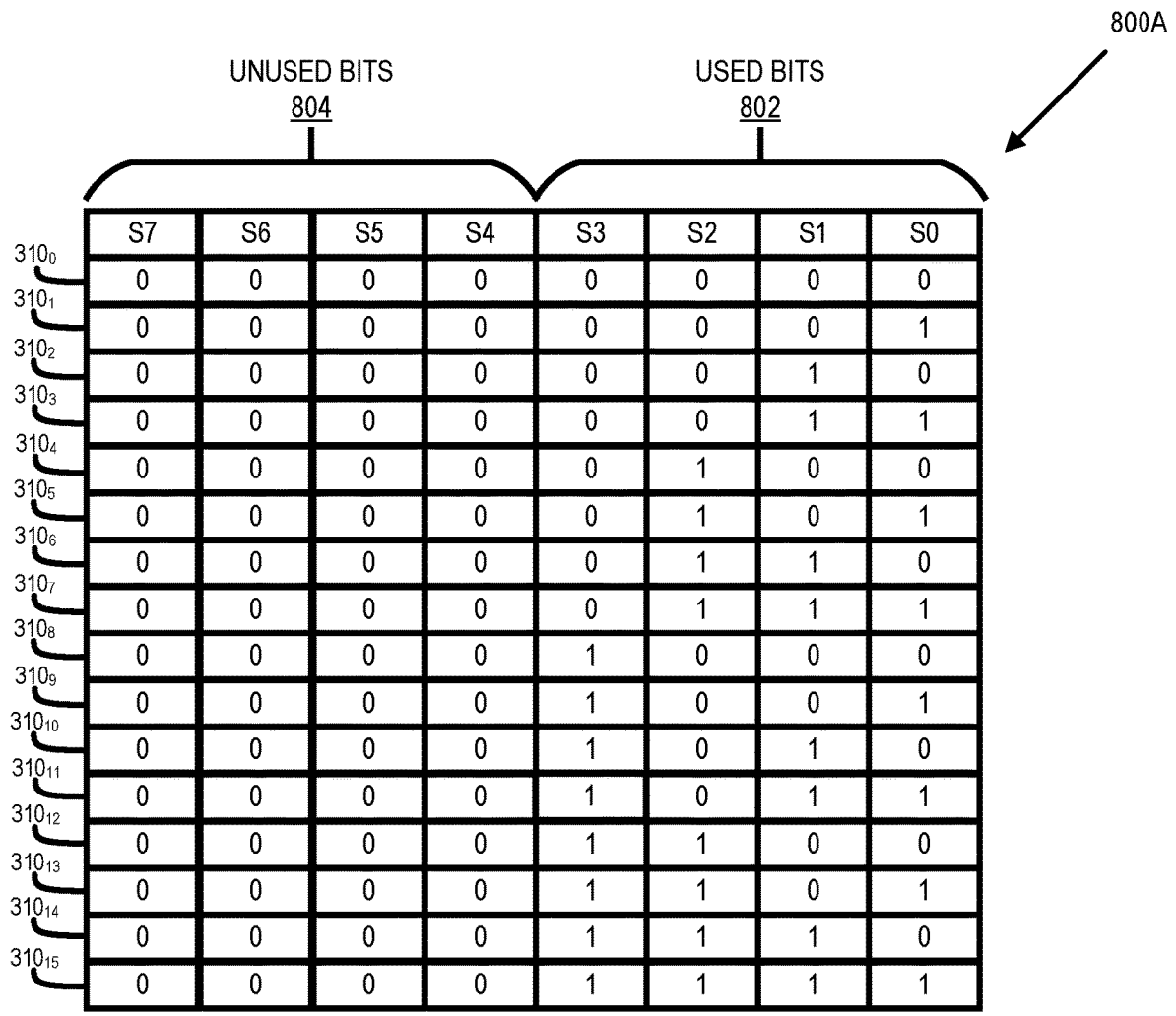
FIG. 8 shows a set of sequential unused bits and a set of sequential used bits that are used to represent a value of a seed, in accordance with some embodiments of the present disclosure.

In one embodiment, the subset of seeds 310 for the pseudorandom sequence table 312 are determined by (1) selecting a set of bits from an original set of bits that are used to represent seeds 310 and (2) setting all other bits from the original set of bits to zero. For instance, if only sixteen seeds 310 are desired to be used even though eight bits are available to represent values of seeds 310, the memory subsystem 110 can select four bits for use to differentiate seeds 310 (referred to as "used bits") and set the four remaining bits to zero (referred to as "unused bits"). For example, FIG. 8 shows an original set of eight bits S0-S7 that can be used to represent a value of a seed 310. To represent a seed subset 800A, the memory subsystem 110 can select the four least significant bits S0-S3 to differentiate the seeds 310 (referred to as used bits 802 as these bits could vary in value as either "1" or "0") and set the four most significant bits S4-S7 to zero (referred to as unused bits 804 as these bits will always remain "0"). Accordingly, the seeds 310 in the seed subset 800A include sixteen seeds $310_0$-$310_{15}$, and the result of the combination of any pair of seeds 310 from the seed subset 800A is also a member of the seed subset 800A. For instance, when the memory subsystem 110 performs an exclusive-or with the seed $310_2$ and the seed $310_7$, the result is the seed $310_5$. Similarly, when the memory subsystem 110 performs an exclusive-or with the seed $310_8$ and the seed $310_9$, the result is the seed $310_1$.

Figure 9:
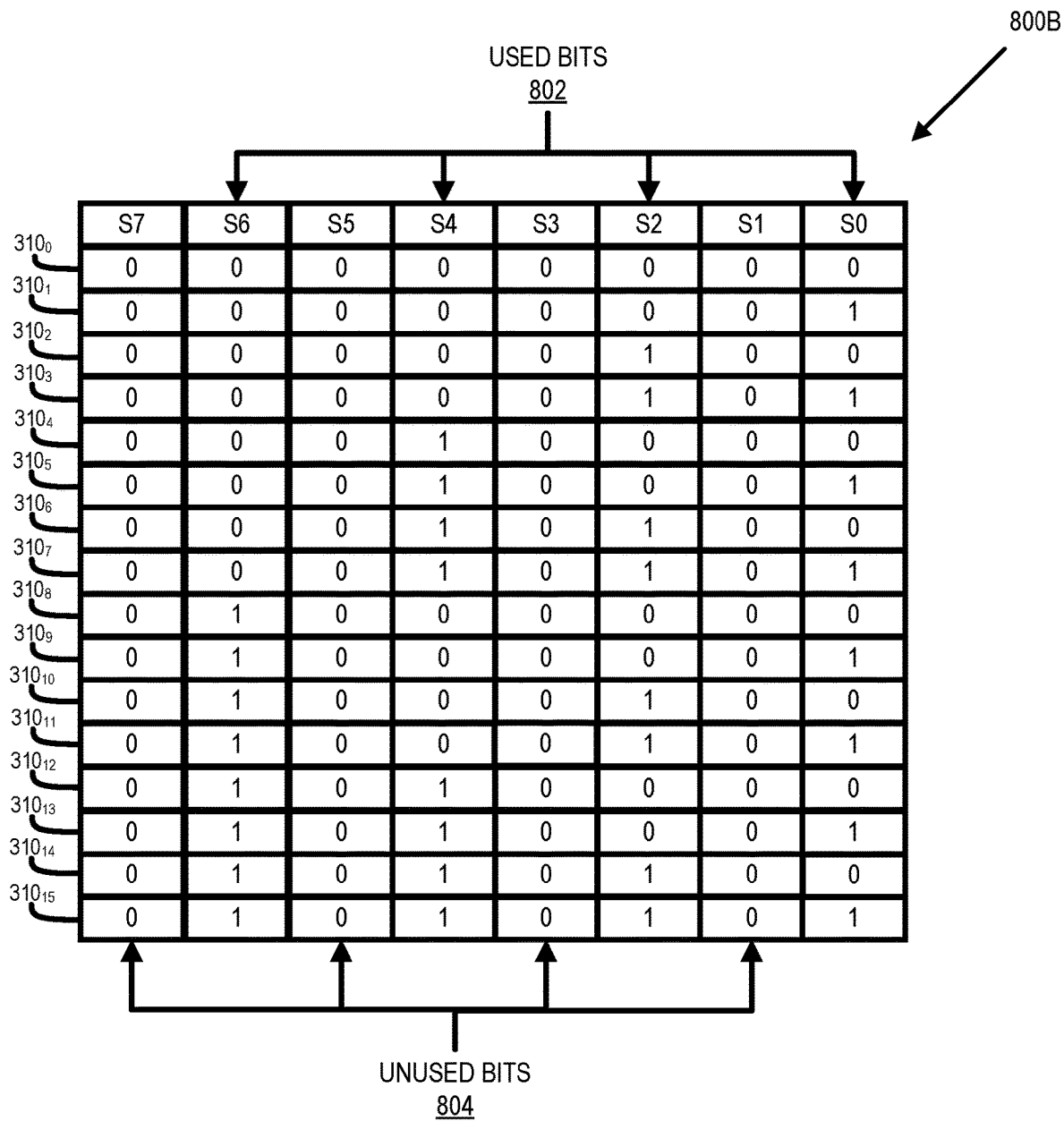
FIG. 9 shows a set of non-sequential unused bits and a set of non-sequential used bits that are used to represent a value of a seed, in accordance with some embodiments of the present disclosure.

Although shown as the used bits 802 being contiguous, the used bits 802 (and, as a result, the unused bits 804) can be non-contiguous. For example, as shown in FIG. 9, the memory subsystem 110 can select the bits S0, S2, S4, and S6 as the used bits 802 and the bits 51, S3, S5, and S7 as the unused bits 804 for the seed subset 800B. Similar to the seed subset 800A, the seeds 310 in the seed subset 800B include sixteen seeds $310_0$-$310_{15}$ and the result of the combination of any pair of seeds 310 from the seed subset 800B is also a member of the seed subset 800B. For instance, when the memory subsystem 110 performs an exclusive-or with the seed $310_6$ and the seed $310_9$, the result is the seed $310_{15}$. Similarly, when the memory subsystem 110 performs an exclusive-or with the seed $310_1$ and the seed $310_8$, the result is the seed $310_9$.

By selecting used bits 802 and unused bits 804, the memory subsystem 110 can greatly reduce the storage requirements for the pseudorandom sequence table 312 when a lower number of seeds 310 is desired or is otherwise acceptable (e.g., only seeds 310 in the seed subset 800 are stored and remaining seeds 310 are not stored or otherwise tracked). Although described as four used bits 802, the memory subsystem 110 can select any subset of bits as used bits 802. In any case, for N used bits 310 in a seed subset 800, $2^N$ seeds 310 are available for use in the seed subset 800, which results in a pseudorandom sequence table 312 with $2^N$ entries 502. In some embodiments, the seed 310 with the value zero (e.g., the seed 310 with the value "00000000") can be discarded, as a seed 310 with the value of zero could result in a non-optimal corresponding pseudorandom sequence 318 (i.e., a pseudorandom sequence 318 with a large number of zero bit values that would not result in properly scrambled data). Accordingly, in these embodiments, for N used bits 310 in a seed subset 800, $2^{N-1}$ seeds 310 are available for use in the corresponding seed subset 800, which results in a pseudorandom sequence table 312 with $2^N-1$ entries 502.

Figure 10:
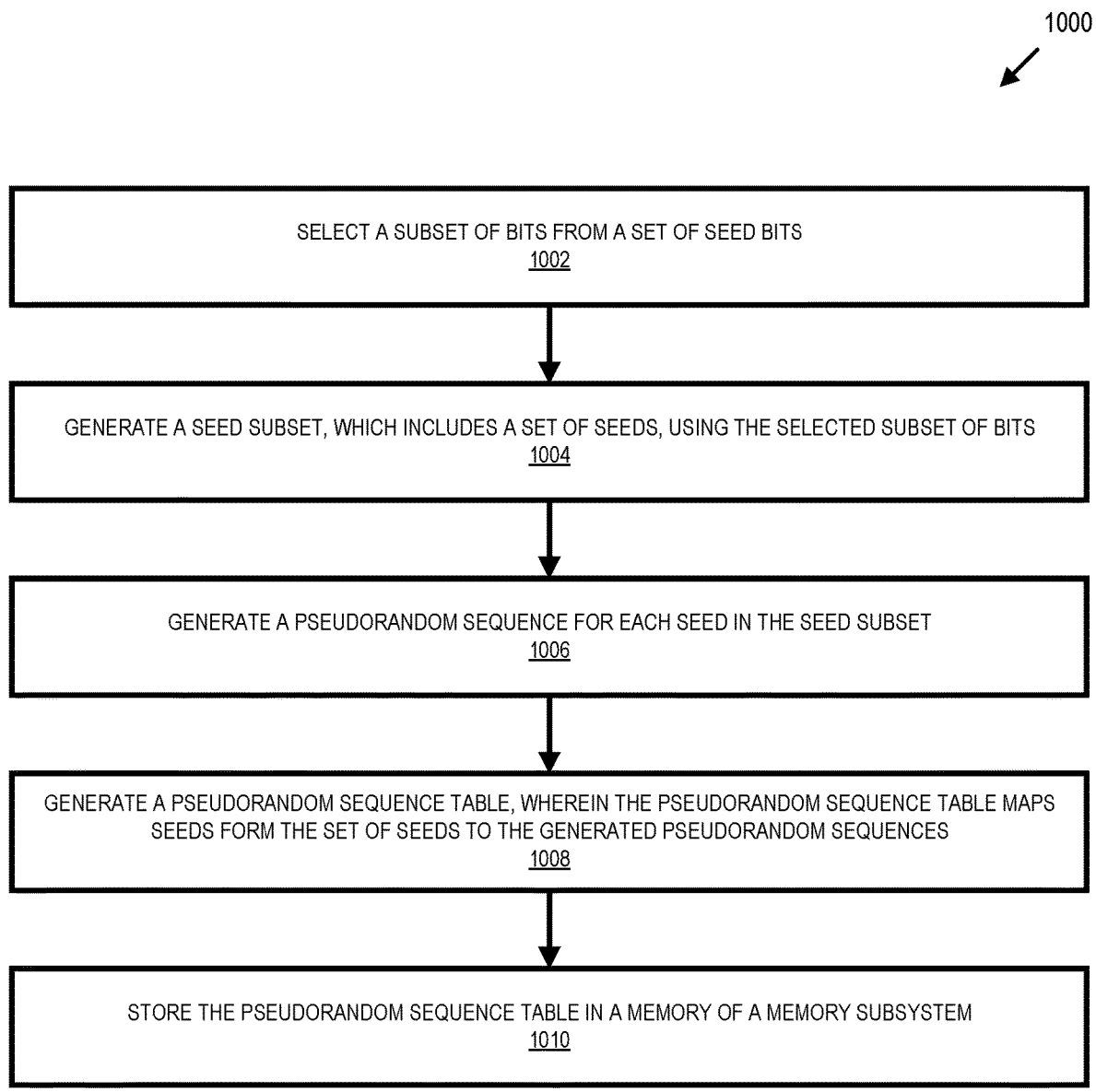
FIG. 10 is a flow diagram of an example method to generate a seed subset, in accordance with some embodiments of the present disclosure.

FIG. 10 is a flow diagram of an example method 1000 to generate a seed subset 800, in accordance with some embodiments of the present disclosure. The method 1000 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1000 is performed by one or more copyback controllers 113 of FIG. 1, while in other embodiments, the method 1000 is performed by a device external to the memory subsystem 110 (e.g., by a host system 120 or a manufacturing or design device coupled to the memory subsystem 110). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1002, the processing device selects a subset of bits from a set of seed bits. For example, as shown in FIG. 8, the bits S0-S7 can represent the set of seed bits and the processing device selects the subset of bits S0-S3 (i.e., the used bits 802 from FIG. 8) at operation 1002. The processing device selects a number of bits at operation 1002 corresponding to the number of seeds 310 the processing device determines will be used for scrambling procedures in the memory subsystem 110. For example, the processing device could determine that there are sixteen possible locations/addresses that are utilized for purposes of scrambling data. In this example, since sixteen possible locations are utilized, four bits will be needed for unique seeds 310 to scramble corresponding data ($2^4$=16 unique seeds 310).

At operation 1004, the processing device generates a seed subset 800 based on the selected subset of bits. In particular, the processing device determines each permutation of values for the selected subset of bits and these permutations define seeds 310 for the seed subset 800. For example, as shown in FIG. 8, the seed subset 800A includes sixteen seeds $310_0$-$310_{15}$ that represent each permutation of values for the bits S0-S3. Similarly, as shown in FIG. 9 the seed subset 800B includes sixteen seeds $310_0$-$310_{15}$ that represent each permutation of values for the selected subset of bits S0, S2, S4, and S6. In these configurations, all bits that were not selected at operation 1002 (i.e., unused bits 804) are set to zero while the selected subset of bits (i.e., used bits 802) are set to either one or zero.

At operation 1006, the processing device determines a pseudorandom sequence 318 for each seed 310 in the seed subset 800. For example, the processing device can use an LFSR scrambler to generate a pseudorandom sequence 318 for each seed 310 in the seed subset 800. By using separate seeds 310, each corresponding pseudorandom sequence 318 is different for purpose of uniquely scrambling data.

Figure 11:
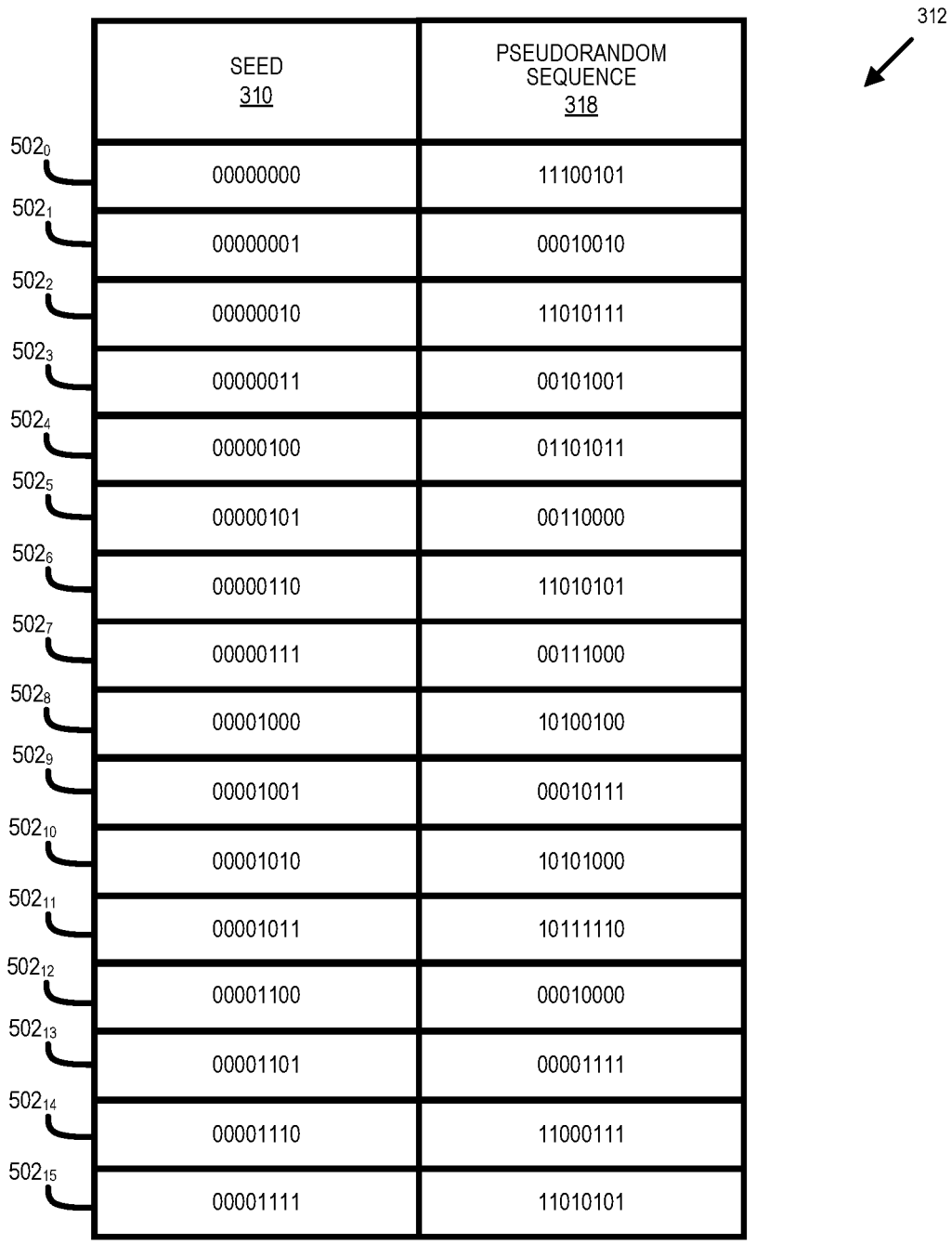
FIG. 11 shows a pseudorandom sequence table generated using a subset of seed values, in accordance with some embodiments of the present disclosure.

At operation 1008, the processing device generates a pseudorandom sequence table 312 based on the seed subset 800 and corresponding pseudorandom sequences 318 for each seed 310 in the seed subset 800. For example, FIG. 11 shows a pseudorandom sequence table 312 that the processing device can generate at operation 1008. As shown, the pseudorandom sequence table 312 includes an entry $502_0$-$502_{15}$ for each seed 310 in in the seed subset 800A of FIG. 8 and each entry 502 includes a corresponding pseudorandom sequence 318. A similar pseudorandom sequence table 312 can be generated based on the seed subset 800B of FIG. 9.

At operation 1010, the pseudorandom sequence table 312 is stored in a memory of the memory subsystem 110. For example, the pseudorandom sequence table 312 can be stored in the local memory 119 and/or a memory devices 130. In this fashion, the pseudorandom sequence table 312 with corresponding mappings of seeds 310 to pseudorandom sequences 318 are available for use for scrambling procedures without the need to generate the pseudorandom sequences 318 each time they are needed. For example, the processing device can store the pseudorandom sequence table 312 for use during the performance of the method 200, the method 600, and/or any other similar methods described herein. Accordingly, corresponding complexity (i.e., additional logic structures), energy, and time devoted to generating pseudorandom sequences 318 can be avoided during each scrambling procedure by precomputing and storing the pseudorandom sequences 318 in the pseudorandom sequence table 312.

In some cases, the memory subsystem 110 could need to alter a field of the first encoded data 320A based on movement from one location in the memory die 324 to another location in the memory die 324 while still maintaining proper ECC encoding based on the distributive property of this encoding procedure. For example, a field in the first encoded data 320A could indicate the address where the first encoded data 320A is stored in the memory die 324 (e.g., the field records the address within the memory die 324 where the first encoded data 320A is stored) or is otherwise based on the address where the first encoded data 320A is stored in the memory components. Accordingly, the field must be altered when the first encoded data 320A is moved such that it reflects the new address within the memory die 324. In these situations where the field needs to be altered, the memory subsystem 110 can employ a similar technique to that described in relation to the methods 200 and 600 and the corresponding copyback systems 300 and 700 by using precomputed values that represent field value changes and corresponding changes to ECC encoding.

Figure 12:
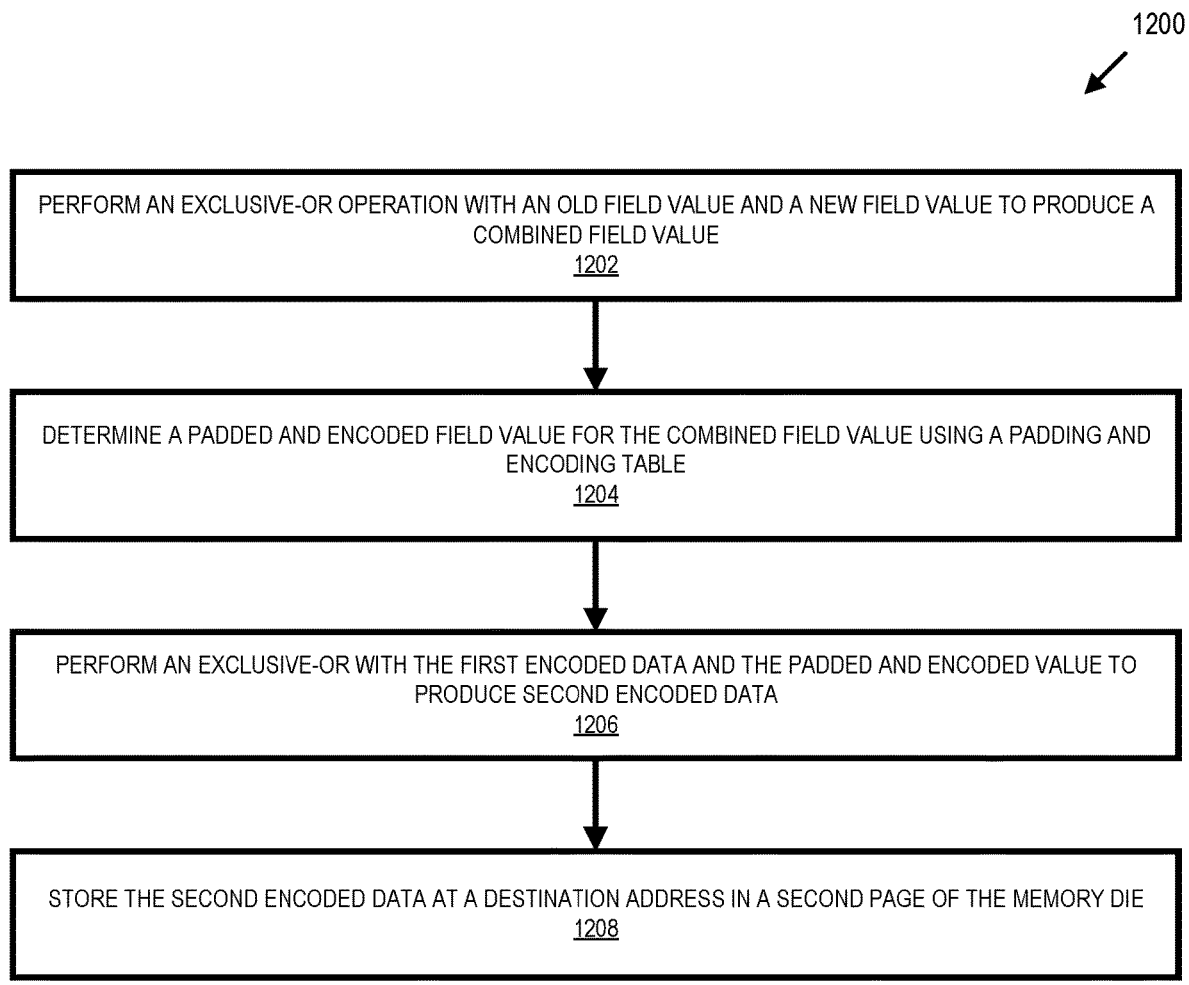
FIG. 12 is a flow diagram of a third example method to efficiently perform a copyback procedure in a memory subsystem using precomputed values, in accordance with some embodiments of the present disclosure.

For example, FIG. 12 is a flow diagram of yet another example method 1200 to efficiently perform a copyback procedure in a memory subsystem 110 using precomputed values, in accordance with some embodiments of the present disclosure. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by one or more copyback controllers 113 of FIG. 1. Although shown in a particular sequence or order, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 13:
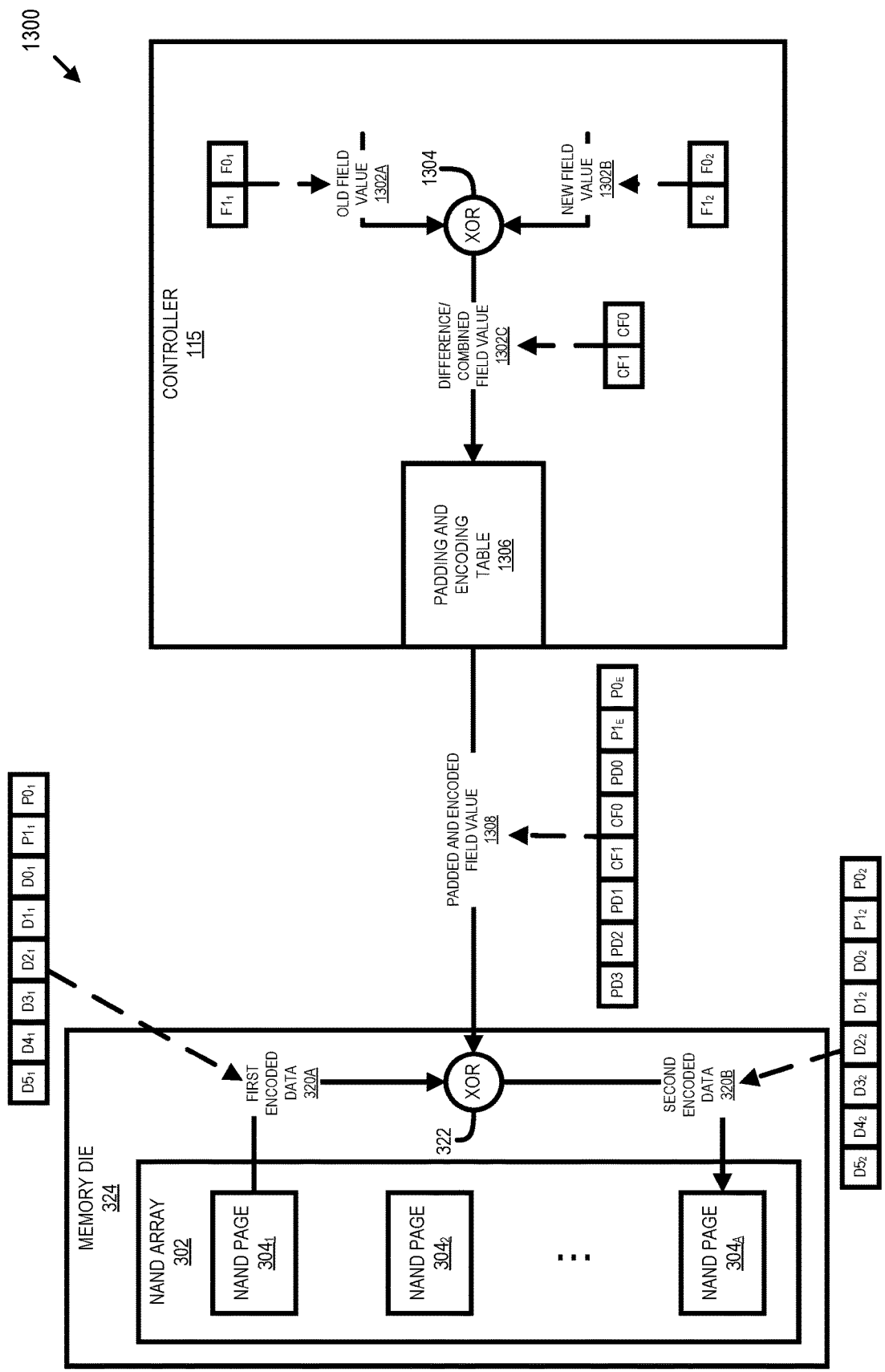
FIG. 13 shows a third example copyback system to perform a copyback procedure using precomputed values, in accordance with some embodiments of the present disclosure.

The method 1200 will be described in relation to the copyback system 1300 shown in FIG. 13. Although described in relation to the copyback system 1300, the processing device can perform the method 1200 in relation to other systems. Accordingly, the use of the copyback system 1300 is for illustrative purposes.

At operation 1202, the processing device combines an old field value 1302A, which corresponds to data/metadata in the first encoded data 320A, with a new field value 1302B, which corresponds to data/metadata to be included in the second encoded data 320B, by performing an exclusive-or with the old field value 1302A and the new field value 1302B to generate a difference/combined field value 1302C. For instance, as shown in FIG. 13, the old field value 1302A can be represented by the bits $F0_1$ and $F1_1$, while the new field value 1302B can be represented by the bits $F0_2$ and $F1_2$ and the combined field value 1302C is represented by the bits CF0 and CF1. In this configuration, the exclusive-or 1304 processes the old field value 1302A and the new field value 1302B to generate the combined field value 1302C. The field values 1302A and 1302B can represent any piece of data or metadata, including an address where the first encoded data 320A and the second encoded data 320B are respectively stored in the memory devices 130 (e.g., the field values 902A and 902B are the addresses where the first encoded data 320A and the second encoded data 320B are respectively stored in the memory devices 130 or are otherwise based on the addresses where the first encoded data 320A and the second encoded data 320B are respectively stored in the memory devices 130).

FIG. 14 shows example values for the field values 1302A and 1302B. In particular, FIG. 14 shows an example value of "01" for the old field value 1302A and an example value of "00" for the new field value 1302B. In this example, the processing device performs an exclusive-or operation with the example value of "01" for the old field value 1302A and the example value of "00" for the new field value 1302B to generate the combined field value 1302C with the value "01". Although shown with two bits, the field values 1302 may have any length (e.g., 1-64 bits).

At operation 1204, the processing device determines a padded and encoded field value 1308 for the combined field value 1302C using a padding and encoding table 1306. In particular, the padding and encoding table 1308 includes mappings of field values 1302 to padded and encoded field values 1308 that have been precomputed prior to use of the memory subsystem 110. For example, a manufacturer can generate and store the padding and encoding table 1308 in the memory subsystem 110 prior to distribution of the memory subsystem 110.

As described herein, the padded and encoded field values 1308 include (1) the combined field value 1302C that is padded to the position of the old field value 1302A in the first encoded data 320A (i.e., padding bits PD0-PD3 are used to position the old field value 1302A) and (2) parity bits for potentially correcting errors. In this configuration, the padded field value portion of the padded and encoded field value 1308 (i.e., the bits PD0-PD3, CF0, and CF1) represents the difference between (1) the data bits $D0_1$-$D5_1$ of the first encoded data 320A, which includes the old field value 1302A and (2) the data bits $D0_2$-$D5_2$ of the second encoded data 320B, which is to include the new field value 1302B. Further, the parity bits of the padded and encoded field value 1308 (i.e., the bits $P1_E$ and $P2_E$) represent the difference between (1) the parity bits $P0_1$ and $P1_1$ of the first encoded data 320A and (2) the parity bits $P0_2$ and $P1_2$ of the second encoded data 320B based on the change from the old field value 1302A and the new field value 1302B. In one embodiment, padding bits are set to "0" so that they will not change the value of encoded data bits when combined via an exclusive-or operation.

FIG. 15 shows a padding and encoding table 1306, according to one example embodiment. As shown, field values 1302 are mapped to padded and encoded field values 1308 in corresponding entries 1502. Since there are four possible field values 1302, there are four entries $1502_0$-$1502_3$. As described above, the padded and encoded field values 1308 include their associated field values 1302 with padding and corresponding parity bits. As shown in the example of FIG. 14, for the example combined field value 1302C of "01", the processing device generates the padded and encoded field value 1308 with the value "00001010" using the example padding and encoding table 1306 of FIG. 15.

Although the padding and encoding table 1306 includes entries 1502 for all possible field values 1302, in some embodiments, the memory subsystem 110 or another device can carefully select entries 1502 in a similar fashion as described in relation to the method 1000 such that a padded and encoded field value 1308 produced by the combination of any two padded and encoded field values 1308 that are members of the padding and encoding table 1306 is also a member of the padding and encoding table 1306. Accordingly, the padding and encoding table 1306 can be reduced in size by maintaining a reduced set of padded and encoded field values 1308.

At operation 1206, the processing device combines the padded and encoded field value 1308 and the first encoded data 320A by performing an exclusive-or with the padded and encoded field value 1308 and the first encoded data 320A to produce the second encoded data 320B. For example, as shown in FIG. 13, the exclusive-or 322 takes the padded and encoded field value 1308 and the first encoded data 320A to produce the second encoded data 320B. In this configuration, while the first encoded data 320A includes the old field value 1302A with corresponding old parity bits $P0_1$ and $P1_1$, the second encoded data 320B includes the new field value 1302B with corresponding new parity bits $P0_2$ and $P1_2$. For instance, as shown in FIG. 14, the exclusive-or 322 takes the padded and encoded field value 1308 with the value "00001010" and the first encoded data 320A with the value "11001011" to produce the second encoded data 320B with the value "11000001".

At operation 1208, the processing device stores the second encoded data 320B at a destination address 306B in a second page 304 of the memory die 324. For example, the processing device stores the second encoded data 320B with the value "11000001" at a destination address within the NAND page $304_A$ at operation 1208.

In some cases, the memory subsystem 110 could need to both alter (1) a field of the first encoded data 320A and (2)

a scrambling seed 310 based on movement from one location in the memory die 324 to another location in the memory die 324, while still maintaining proper ECC encoding. In these situations, the memory subsystem 110 can employ a similar technique to that described in relation to the methods 200, 600, and 1200 and the corresponding copyback systems 300, 700, and 1300 that use precomputed values.

Figure 16:
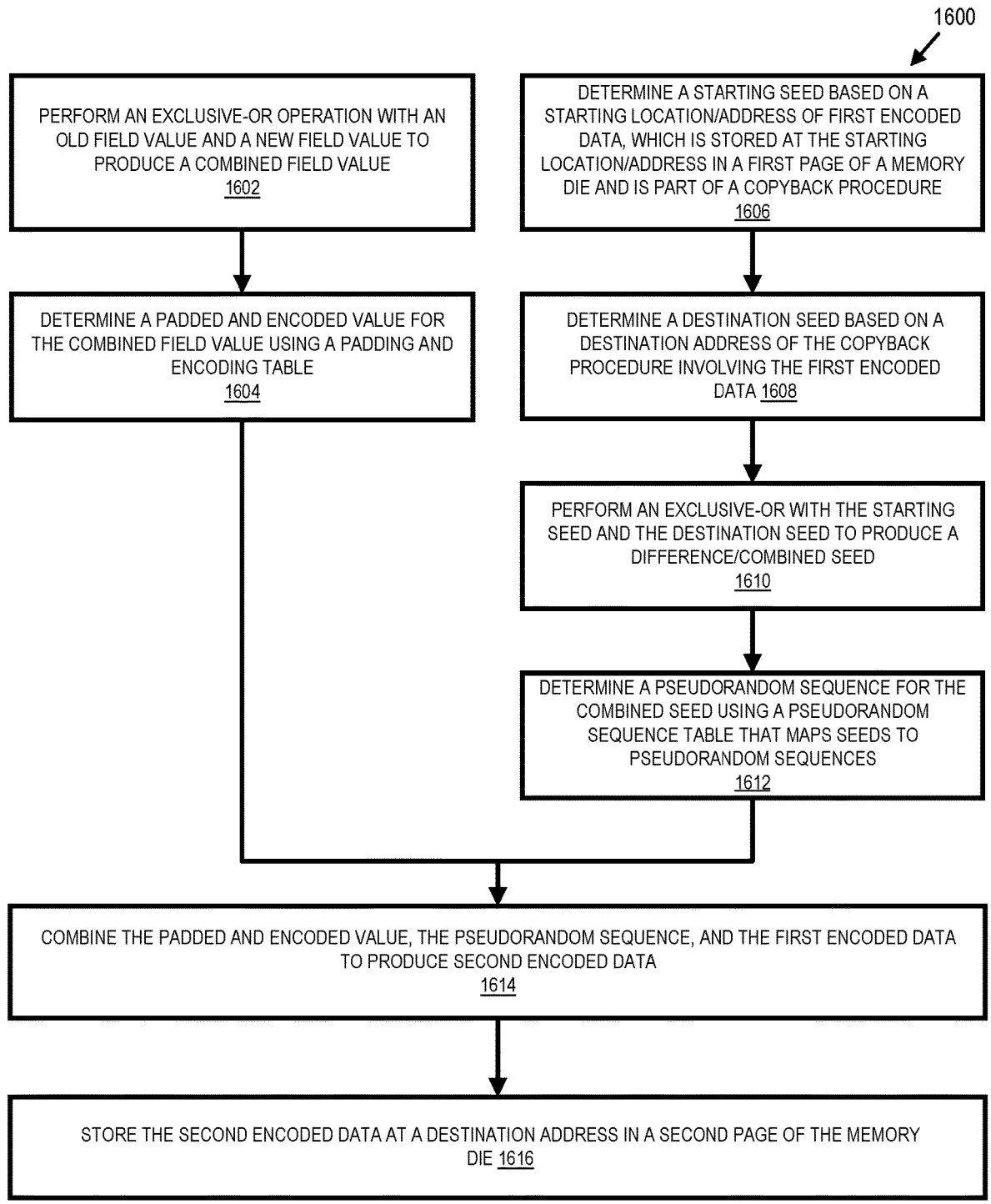
FIG. 16 is a flow diagram of a fourth example method to efficiently perform a copyback procedure in a memory subsystem using precomputed values, in accordance with some embodiments of the present disclosure.

For example, FIG. 16 is a flow diagram of still another example method 1600 to efficiently perform a copyback procedure in a memory subsystem 110 using precomputed values, in accordance with some embodiments of the present disclosure. The method 1600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1600 is performed by one or more copyback controllers 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 17:
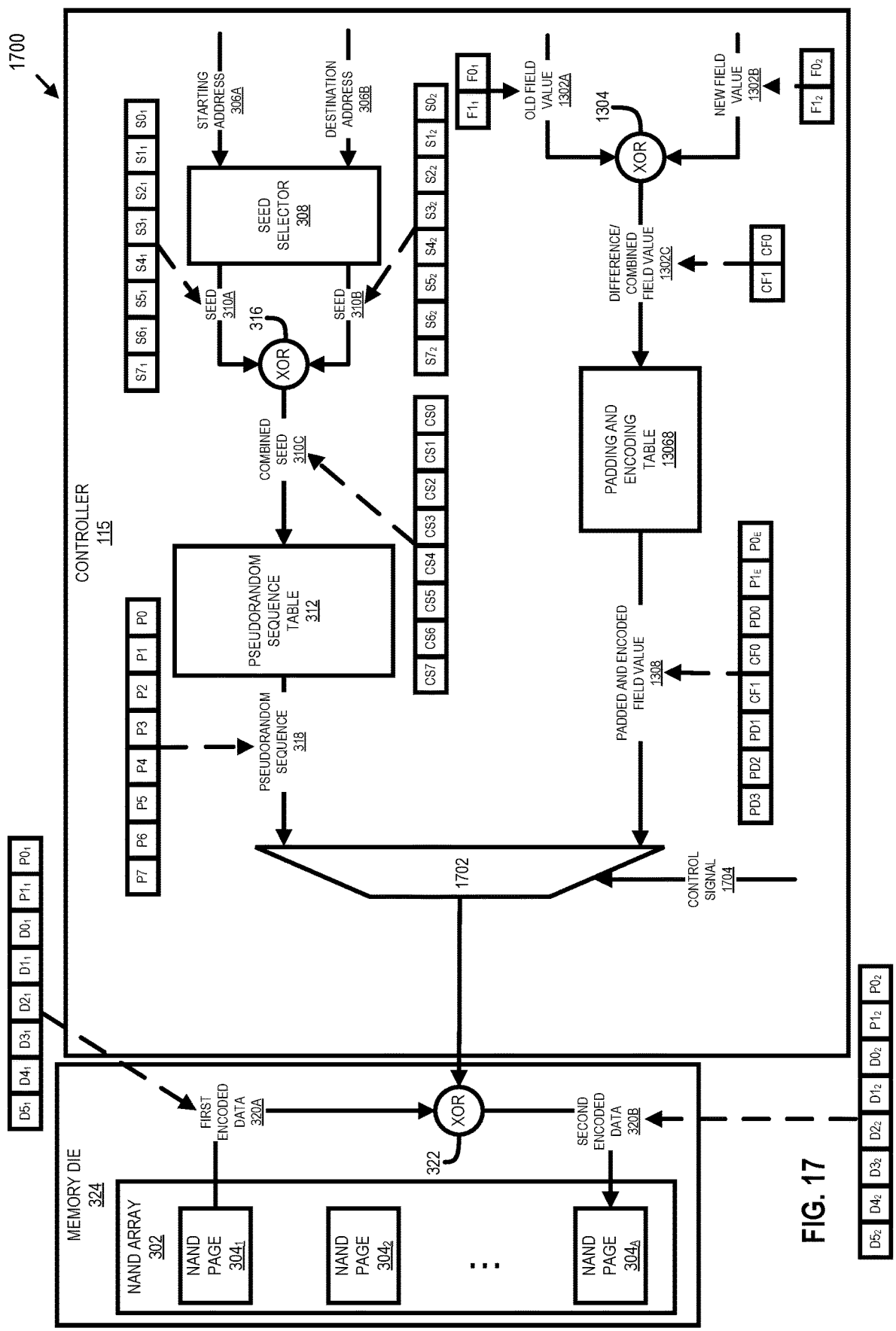
FIG. 17 illustrates a fourth example copyback system to perform a copyback procedure using precomputed values, in accordance with some embodiments of the present disclosure.

The method 1600 will be described in relation to the copyback system 1700 shown in FIG. 17. Although described in relation to the copyback system 1700, the processing device can perform the method 1600 in relation to other systems. Accordingly, the use of the copyback system 1700 is for illustrative purposes.

As shown in FIG. 16, the processing device can perform the operations 1602 and 1604 in a similar fashion to the operations 1202 and 1204 of the method 1200, respectively. Namely, since the first encoded data 320A includes an old field value 1302A but needs to include a new field value 1302B, the processing device generates a padded and encoded field value 1308 that includes the combined field value 1302C with padding to the correct position in the first encoded data 320A and updated parity bits in the same way as performed in the method 1200.

Similarly, the processing device can perform the operations 1606-1612 in a similar fashion to the operations 202-208 of the method 200, respectively. Namely, since the first encoded data 320A is also scrambled using a starting seed 310A but needs to be scrambled using the destination seed 310B, generating a pseudorandom sequence 318 based on the starting seed 310A and the destination seed 310B can be accomplished in the same way in the method 1600 as performed in the method 200.

Following generating the padded and encoded field value 1308 at operation 1604 and the pseudorandom sequence 318 at operation 1612, the processing device combines the padded and encoded field value 1308, the pseudorandom sequence 318, and the first encoded data 320A by performing an exclusive-or with the padded and encoded field value 1308, the pseudorandom sequence 318, and the first encoded data 320A to generate the second encoded data 320B at operation 1614. For example, as shown in FIG. 17, the multiplexer 1702 can receive a control signal 1704 that selects between the padded and encoded field value 1308 and the pseudorandom sequence 318 to combine each with the first encoded data 320A using the exclusive-or 322. In particular, the multiplexer 1702 selects (1) the padded and encoded field value 1308 based on a first value of the control signal 1704 and (2) the pseudorandom sequence 318 based on a second value of the control signal 1704 such that the exclusive-or 322 combines each string of values with the first encoded data 320A.

In this configuration, while the first encoded data 320A is scrambled using the seed 310A and includes the old field value 1302A, the second encoded data 320B is efficiently scrambled (e.g., reduced consumption of time and/or processing resources) using the seed 310B and includes the new field value 1302B while still maintaining proper ECC encoding based on the combined field value 1302C and the padded and encoded field value 1308.

At operation 1612, the processing device stores the second encoded data 320B at the destination address 306B in a second page 304.

Figure 18:
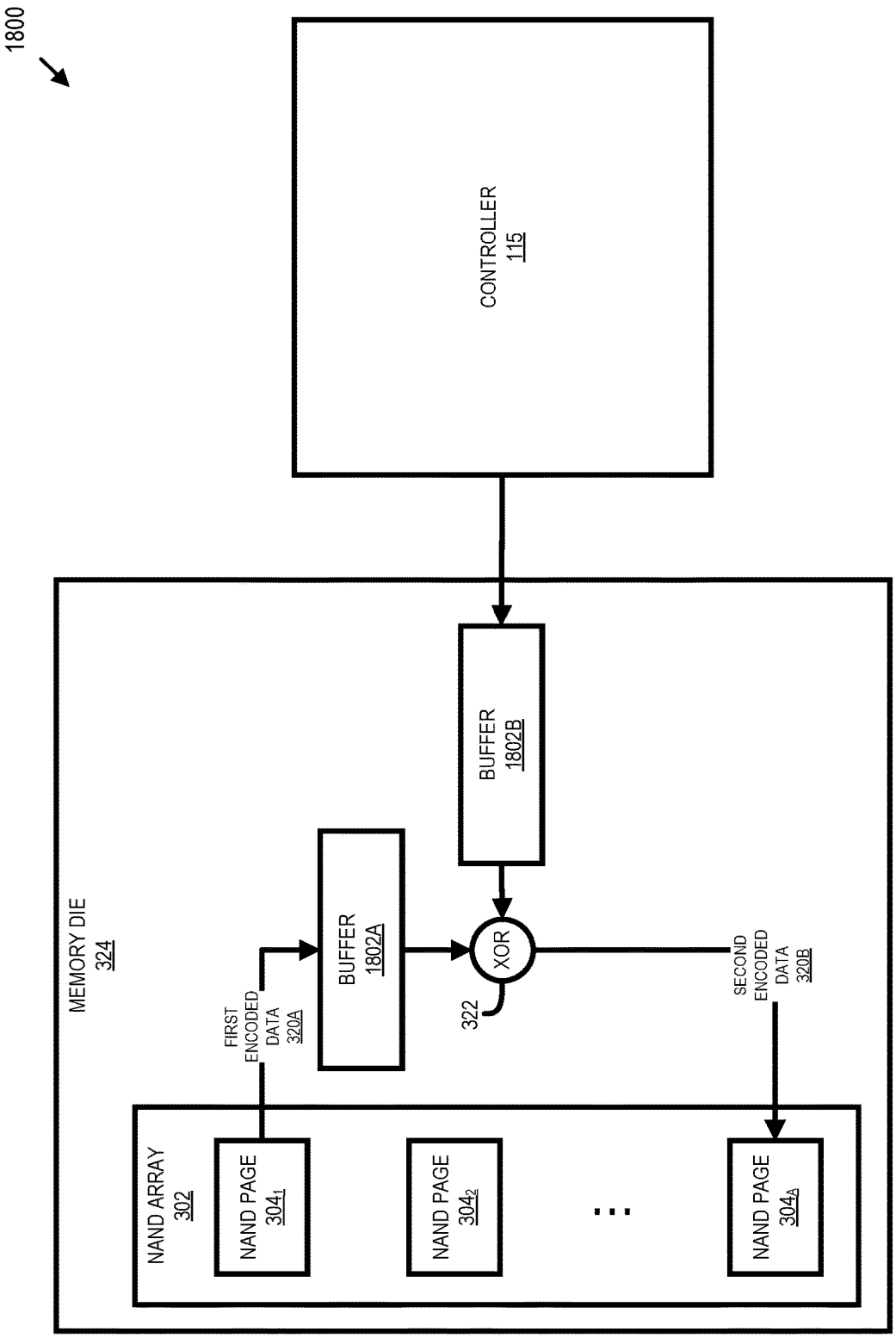
FIG. 18 illustrates a fifth copyback system with a pair of buffers, which can be used in conjunction with anyone of the first, second, third, and fourth copyback systems, in accordance with some embodiments of the present disclosure.

Although shown as the controller 115 transmitting/passing values to the memory die 324 such that these values are combined as the first encoded data 320A is transferred between NAND pages 304, in other embodiments, the copyback controllers 113 and/or each of the copyback systems 300, 700, 1300, and 1700 can utilize a set of buffers 1802 to facilitate the transfer and combination. For example, FIG. 18 shows a copyback system 1800 that includes a first buffer 1802A, which stores/receives the first encoded data 320A from the NAND page 304$_1$, and a second buffer 1802B, which stores/receives values from the controller 115 (e.g., a pseudorandom sequence 318, a combined pseudorandom sequence 318C, and/or a padded and encoded field value 1308). As entries are populated/stored in each buffer 1802A and 1802B, the entries can be combined using the exclusive-or 322 to produce the second encoded data 320B for storage in the NAND page 304$_4$.

Figure 19:
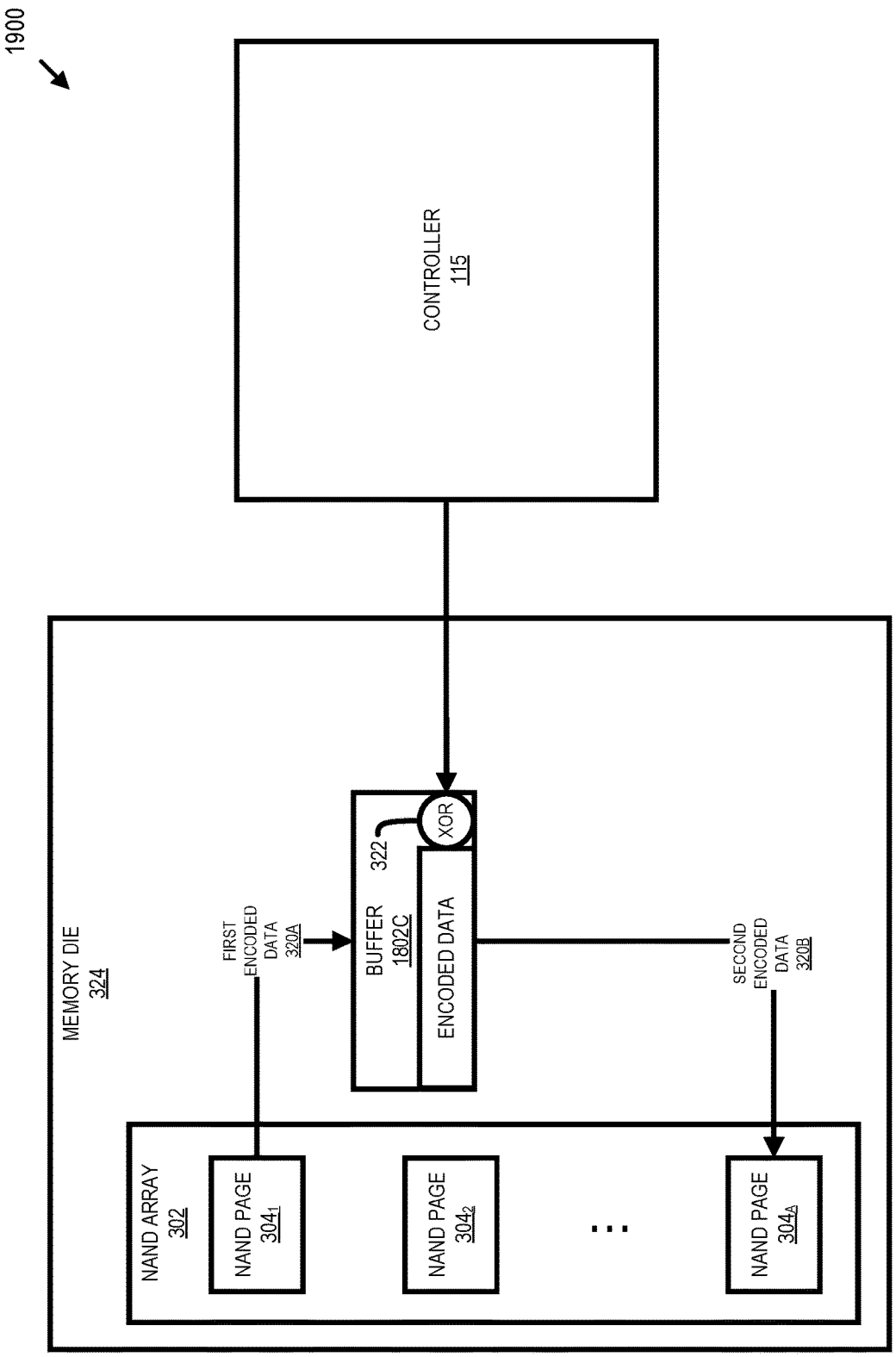
FIG. 19 illustrates a sixth copyback system with a single buffer, which can be used in conjunction with anyone of the first, second, third, and fourth copyback systems, in accordance with some embodiments of the present disclosure.

Alternatively, the copyback controllers 113 and/or each of the copyback systems 300, 700, 1300, and 1700 can utilize a single buffer to facilitate the transfer and combination. For example, FIG. 19 shows a copyback system 1900 that includes a single buffer 1802C, which stores/receives the first encoded data 320A from the NAND page 304$_1$. In this example, values from the controller 115 (e.g., a pseudorandom sequence 318, a combined pseudorandom sequence 318C, and/or a padded and encoded field value 1308) are passed directly to the buffer 1802C such that the values from the controller 115 are combined with the first encoded data 320A in the buffer 1802C to produce the second encoded data 320B for storage in the NAND page 304$_4$. Accordingly, in this embodiment, the combination (e.g., using the exclusive-or 322) is performed as the first encoded data 320A sits in the buffer 1802C. Although described as the buffer 1802C storing the first encoded data 320A and a value from the controller 115 being combined with the first encoded data 320A while the first encoded data 320A resides in the buffer 1802C, in some embodiments, the buffer 1802C can store values from the controller 115 instead of the first encoded data 320A. In these embodiments, a value from the controller 115 is combined with the first encoded data 320A while the value from the controller 115 resides in the buffer 1802C.

Figure 20:
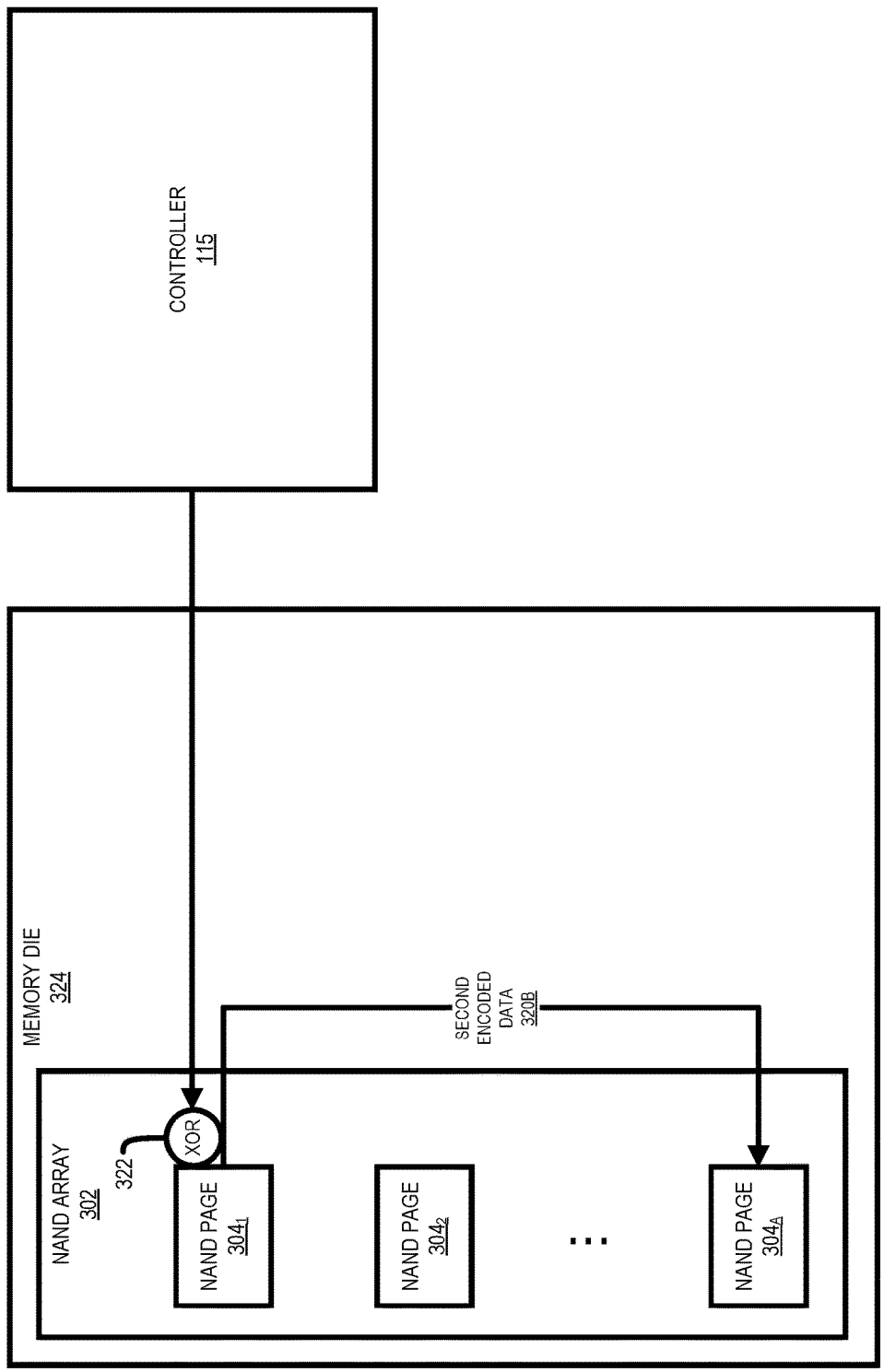
FIG. 20 illustrates a seventh copyback system with a controller delivering values directly to a starting NAND page, which can be used in conjunction with anyone of the first, second, third, and fourth copyback systems, in accordance with some embodiments of the present disclosure.
Figure 21:
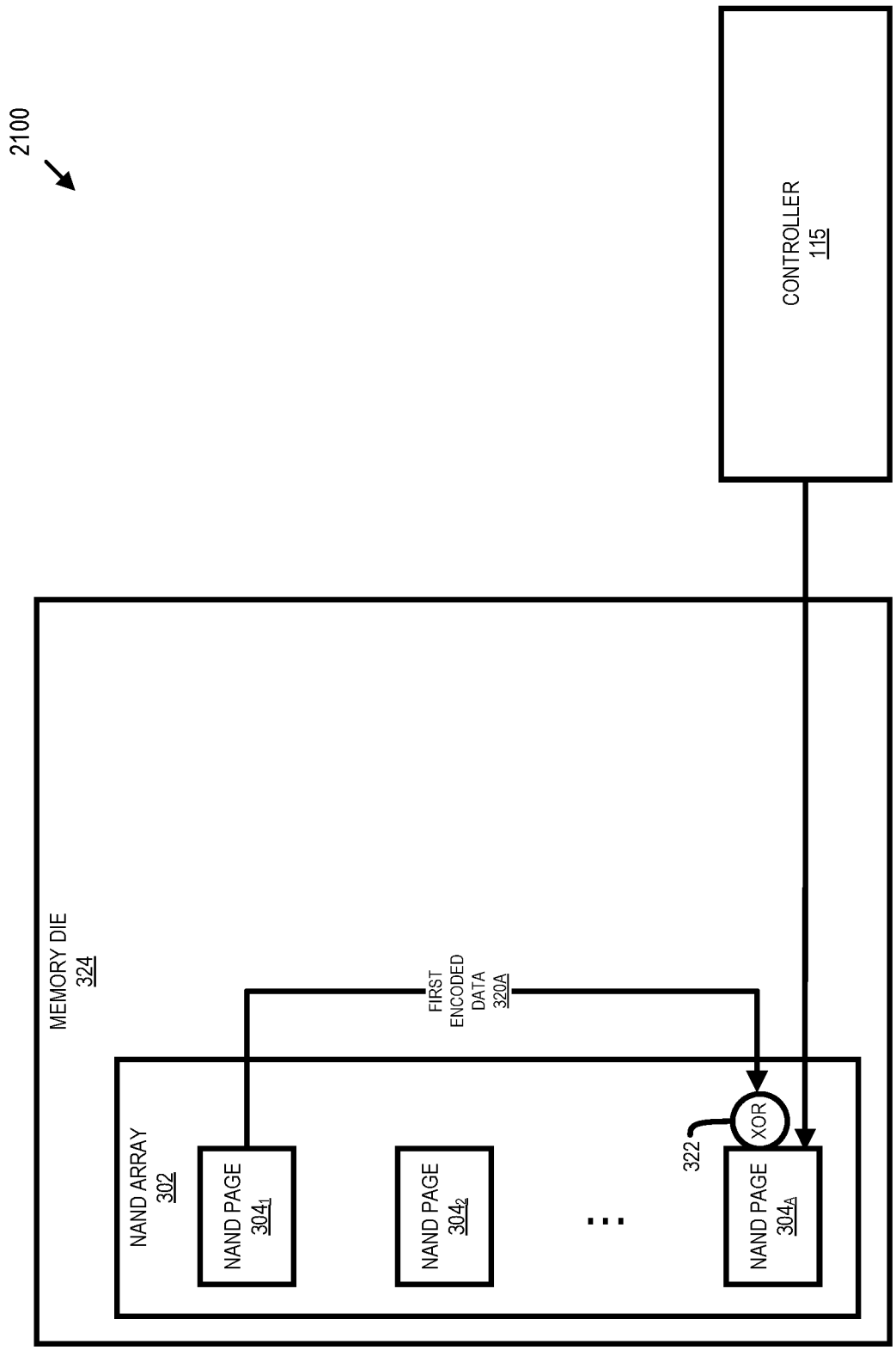
FIG. 21 illustrates an eighth copyback system with a controller delivering values directly to a destination NAND page, which can be used in conjunction with anyone of the first, second, third, and fourth copyback systems, in accordance with some embodiments of the present disclosure.

In some embodiments, the copyback controllers 113 and/or each of the copyback systems 300, 700, 1300, and 1700 combine the first encoded data 320A with values from the controller 113 while the first encoded data resides in a NAND page 304. For example, as shown in the copyback system 2000 of FIG. 20, the values from the controller 115 (e.g., a pseudorandom sequence 318, a combined pseudorandom sequence 318C, and/or a padded and encoded field value 1308) are passed directly to the NAND page 304$_1$ such that the values from the controller 115 are combined (e.g., using the exclusive-or 322) with the first encoded data 320A in the NAND page 3041 to produce the second encoded data 320B for storage in the NAND page 304$_A$. In another example, as shown in the copyback system 2100 of FIG. 21, the values from the controller 115 (e.g., a pseudorandom sequence 318, a combined pseudorandom sequence 318C, and/or a padded and encoded field value 1308) are passed directly to the NAND page 304$_A$. In this embodiment, the first encoded data 320A is moved to the NAND page 304$_A$ without alteration such that the values from the controller 115 are combined (e.g., using the exclusive-or 322) with the first encoded data 320A in the NAND page 304$_A$ to produce the second encoded data 320B.

Figure 22:
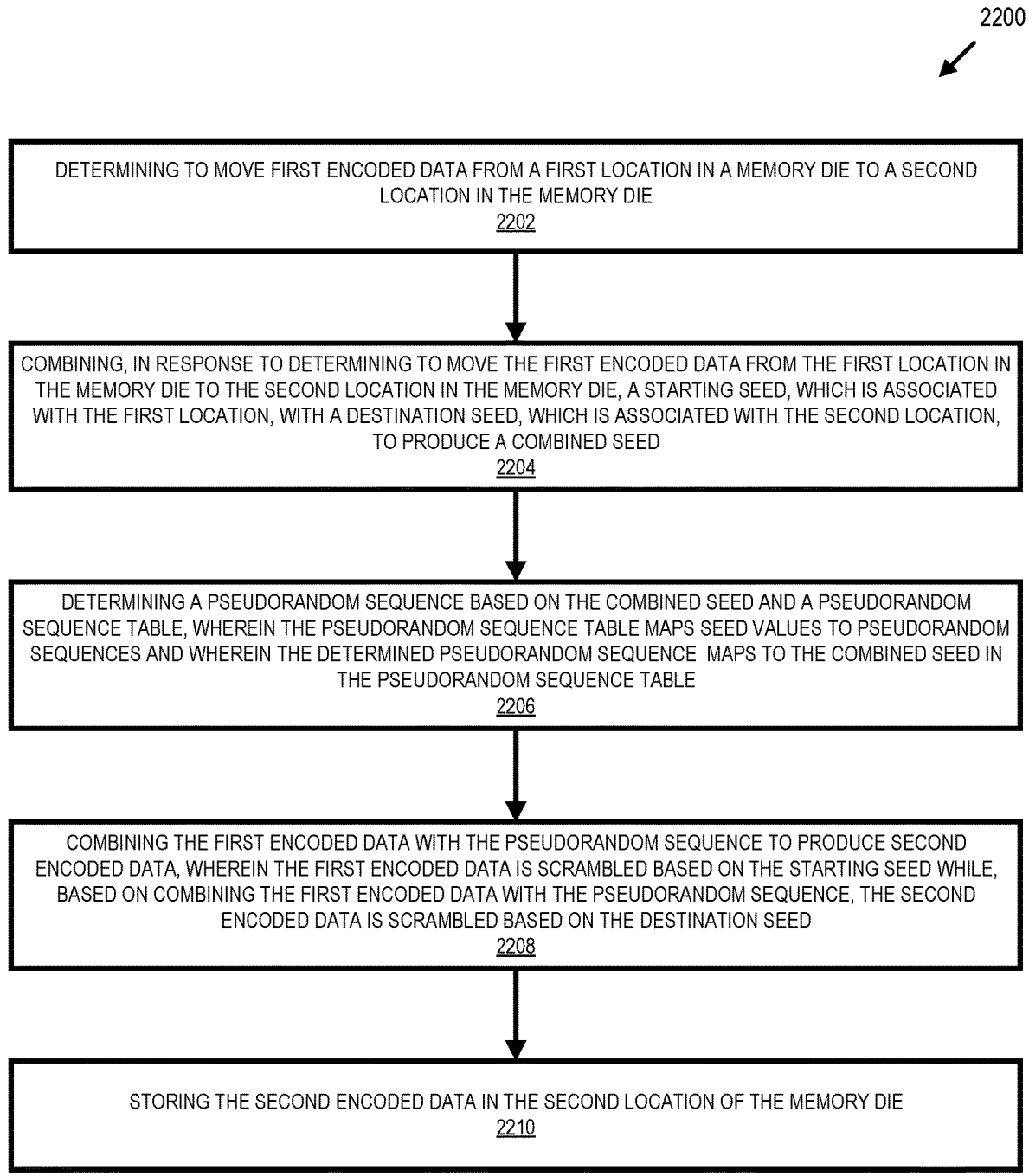
FIG. 22 a flow diagram of a fifth example method to efficiently perform a copyback procedure in a memory subsystem, in accordance with some embodiments of the present disclosure.

FIG. 22 is a flow diagram of an additional example method 2200 to efficiently perform a copyback procedure in a memory subsystem 110 using precomputed values, in accordance with some embodiments of the present disclosure. The method 2200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 2200 is performed by one or more copyback controllers 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 2202, the processing device determines to move first encoded data from a first location in a memory die to a second location in the memory die. For example, while performing garbage collection, the processing device can determine to move the first encoded data 320A from the starting address 306A in the NAND page 3041 to the destination address 306B in the NAND page 304$_A$ at operation 2202.

At operation 2204, in response to determining to move the first encoded data from the first location in the memory die to the second location in the memory die, the processing device combines a starting seed, which is associated with the first location, with a destination seed, which is associated with the second location, to produce a combined seed. For example, the processing device can combine the seed 310A (i.e., the starting seed), which is associated with the starting address 306A in the NAND page 3041, with the seed 310B (i.e., the destination seed), which is associated with the destination address 306B in the NAND page 304$_A$, to produce the combined seed 310C at operation 2204. This combination can be performed using an exclusive-or operation.

At operation 2206, the processing device determines a pseudorandom sequence based on the combined seed and a pseudorandom sequence table. The pseudorandom sequence table maps seed values to pseudorandom sequences and the determined pseudorandom sequence maps to the combined seed in the pseudorandom sequence table. For example, the processing device can use the pseudorandom sequence table 312 to determine a pseudorandom sequence 318 for the combines seed 310C at operation 2206.

At operation 2208, the processing device combines the first encoded data with the pseudorandom sequence to produce second encoded data. In this configuration, the first encoded data is scrambled based on the starting seed while, based on combining the first encoded data with the pseudorandom sequence, the second encoded data is scrambled based on the destination seed. For example, the processing device can combine the pseudorandom sequence 318 with the first encoded data 320A to produce the second encoded data 320B. Based on the distributive property of the scrambling technique employed by the LFSR scrambler 316, the second encoded data 320B is now encoded/scrambled using the seed 310B instead of the seed 310A, which was used to scramble the first encoded data 320A. Although described as using an LFSR scrambler, any type of scrambler can be used to generate the pseudorandom sequence 318 as long as it meets the distributive property in each of the corresponding embodiments described herein.

At operation 2210, the processing device stores the second encoded data in the second location of the memory die. For example, the processing device stores the second encoded data 320B at the destination address 306B in the NAND page 304$_A$ at operation 2210. Accordingly, the processing device has completed the copyback procedure while still maintaining proper scrambling of the data according to the location of the data in storage based on the distributive property of this scrambling/encoding procedure.

Although described as the processing devices performing or supporting the performance of copyback procedures, the techniques and systems described herein are not limited to these situations. In particular, the processing devices described herein can perform one or more operations from the methods 200, 600, 1000, 1200, 1600, and 2200 as part of any scenario that requires efficient (1) modification of a scrambler seed for encoded data, (2) update to ECC for encoded data, and/or (3) modification of field values for encoded data.

Figure 23:
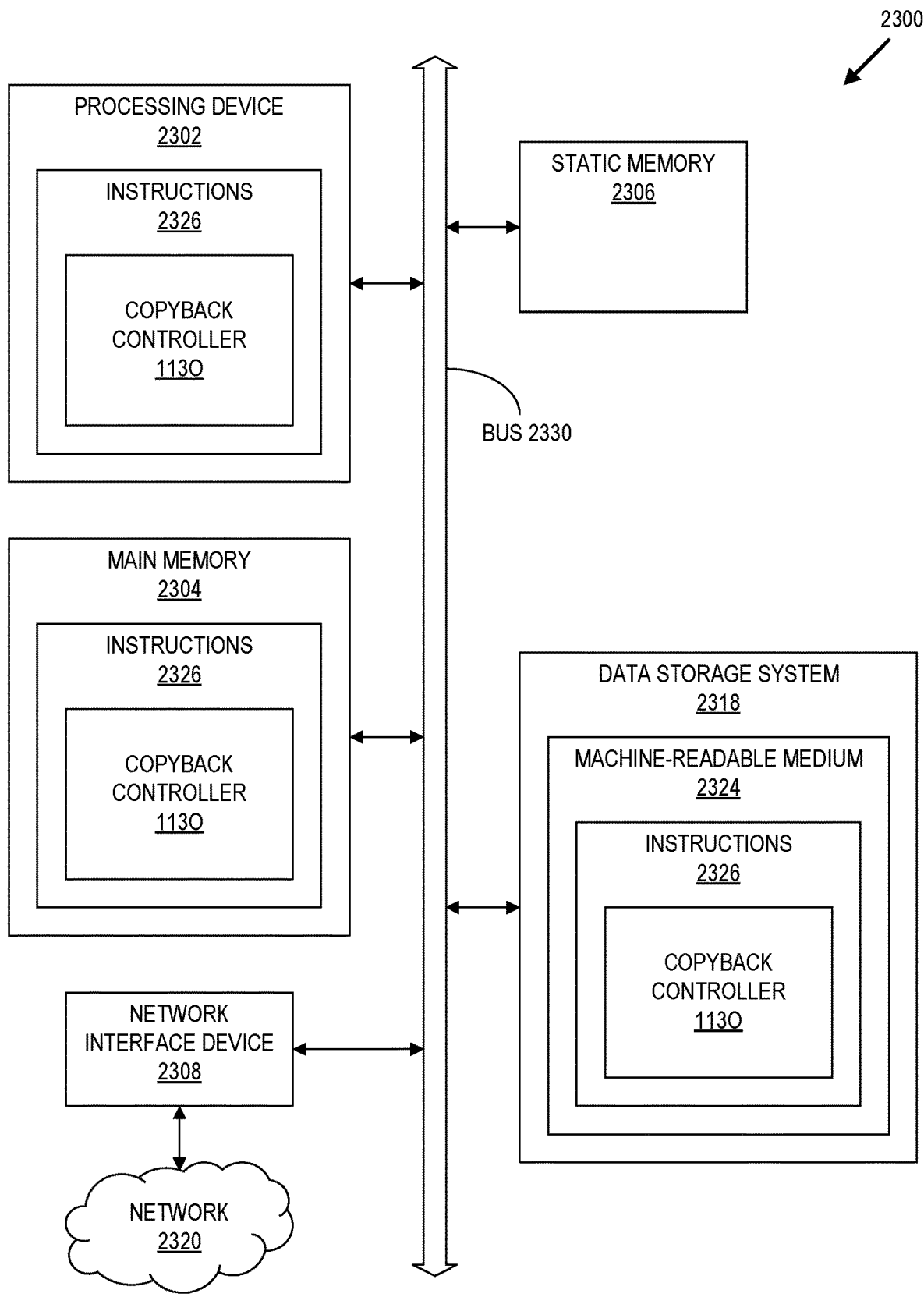
FIG. 23 is a block diagram of an example computer system in which embodiments of the present disclosure may operate.

FIG. 23 illustrates an example machine of a computer system 2300 within which a set of instructions, for causing the machine to perform any one or more of the methodologies discussed herein, can be executed. In some embodiments, the computer system 2300 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the copyback controller(s) 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2300 includes a processing device 2302, a main memory 2304 (e.g., read-only memory (ROM), flash memory, dynamic random access memory (DRAM) such as synchronous DRAM (SDRAM) or Rambus DRAM (RDRAM), etc.), a static memory 2306 (e.g., flash memory, static random access memory (SRAM), etc.), and a data storage system 2318, which communicate with each other via a bus 2330.

Processing device 2302 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2302 can also be one or more special-purpose processing devices such as an application specific integrated circuit (ASIC), a field programmable gate array (FPGA), a digital signal processor (DSP), network processor, or the like. The processing device 2302 is configured to execute instructions 2326 for performing the operations and steps discussed herein. The computer system 2300 can further include a network interface device 2308 to communicate over the network 2320.

The data storage system 2318 can include a machine-readable storage medium 2324 (also known as a computer-readable medium) on which is stored one or more sets of instructions 2326 or software embodying any one or more of the methodologies or functions described herein. The instructions 2326 can also reside, completely or at least partially, within the main memory 2304 and/or within the processing device 2302 during execution thereof by the computer system 2300, the main memory 2304 and the processing device 2302 also constituting machine-readable storage media. The machine-readable storage medium 2324, data storage system 2318, and/or main memory 2304 can correspond to the memory subsystem 110 of FIG. 1.

In one embodiment, the instructions 2326 include instructions to implement functionality corresponding to a copyback controller (e.g., the copyback controller(s) 113 of FIG. 1). While the machine-readable storage medium 2324 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115 and/or the memory devices 130, may carry out the computer-implemented methods 200, 600, 1000, 1200, 2000, and 2200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   determining to move first encoded data from a first location in a memory die to a second location in the memory die;
   combining, in response to determining to move the first encoded data from the first location in the memory die to the second location in the memory die, a starting seed, which is associated with the first location, with a destination seed, which is associated with the second location, to produce a combined seed;
   determining a pseudorandom sequence based on the combined seed and a pseudorandom sequence table, wherein the pseudorandom sequence table maps seed values to pseudorandom sequences and wherein the determined pseudorandom sequence maps to the combined seed in the pseudorandom sequence table;
   combining the first encoded data with the determined pseudorandom sequence to produce second encoded data, wherein the first encoded data is scrambled based on the starting seed while, based on combining the first encoded data with the pseudorandom sequence, the second encoded data is scrambled based on the destination seed; and
   storing the second encoded data in the second location of the memory die.

2. The method of claim 1, further comprising:
   determining a set of used bits amongst a set of seed bits that represent the seed values in the pseudorandom sequence table;
   determining each permutation of values for the set of used bits while setting remaining bits in the set of seed bits to zero to produce a subset of seeds;
   generating a pseudorandom sequence for each seed in the subset of seeds; and
   generating the pseudorandom sequence table to map the subset of seeds to corresponding pseudorandom sequences.

3. The method of claim 2, wherein at least two bits in the set of used bits are non-contiguous in the set of seed bits such that an intervening bit, which is not part of the set of used bits, separates the at least two bits.

4. The method of claim 2, wherein a result of the combination of any pair of seeds in the subset of seeds is part of the subset of seeds.

5. The method of claim 1, further comprising:
   determining that a first field value in the first encoded data is to be changed to a second field value in response to determining that the first encoded data is to move from the first location to the second location;
   combining the first field value with the second field value to produce a combined field value; and
   determining a padded and encoded field value based on the combined field value and a padding and encoding table, wherein the padding and encoding table maps field values to padded and encoded field values that each include (1) the a field value padded to a position that corresponds to a position of the first field value in the first encoded data and (2) parity bits for the field value padded to the position.

6. The method of claim 5, further comprising:
   combining the padded and encoded field value with the determined pseudorandom sequence prior to combining with the first encoded data or combining the padded and encoded field value with the combined pseudorandom sequence and the first encoded data to produce the second encoded data.

7. The method of claim 5, wherein the first field value is a value based on an address of the first location and the second field value is a value based on an address of the second location.

8. The method of claim 1, wherein combining the first encoded data with the determined pseudorandom sequence to produce the second encoded data is performed by logic within the memory die.

9. A non-transitory computer-readable storage medium comprising instructions that, when executed by a processing device, cause the processing device to:
   determine to move first encoded data from a first location in a memory die to a second location in the memory die;
   combine, in response to determining to move the first encoded data from the first location in the memory die to the second location in the memory die, a starting seed, which is associated with the first location, with a destination seed, which is associated with the second location, to produce a combined seed;
   determine a pseudorandom sequence based on the combined seed and a pseudorandom sequence table, wherein the pseudorandom sequence table maps seed values to pseudorandom sequences and wherein the determined pseudorandom sequence maps to the combined seed in the pseudorandom sequence table;
   combine the first encoded data with the determined pseudorandom sequence to produce second encoded data, wherein the first encoded data is scrambled based on the starting seed while, based on combining the first encoded data with the pseudorandom sequence, the second encoded data is scrambled based on the destination seed; and
   store the second encoded data in the second location of the memory die.

10. The non-transitory computer-readable medium of claim 9, wherein the processing device is further to:
    determine a set of used bits amongst a set of seed bits that represent the seed values in the pseudorandom sequence table;
    determine each permutation of values for the set of used bits while setting remaining bits in the set of seed bits to zero to produce a subset of seeds;
    generate a pseudorandom sequence for each seed in the subset of seeds; and
    generate the pseudorandom sequence table to map the subset of seeds to corresponding pseudorandom sequences.

11. The non-transitory computer-readable medium of claim 10, wherein at least two bits in the set of used bits are non-contiguous in the set of seed bits such that an intervening bit, which is not part of the set of used bits, separates the at least two bits.

12. The non-transitory computer-readable medium of claim 10, wherein a result of the combination of any pair of seeds in the subset of seeds is part of the subset of seeds.

13. The non-transitory computer-readable medium of claim 9, wherein the processing device is further to:
    determine that a first field value in the first encoded data is to be changed to a second field value in response to determining that the first encoded data is to move from the first location to the second location;
    combine the first field value with the second field value to produce a combined field value;
    determine a padded and encoded field value based on the combined field value and a padding and encoding table, wherein the padding and encoding table maps field values to padded and encoded field values that each include (1) the a field value padded to a position that corresponds to a position of the first field value in the first encoded data and (2) parity bits for the field value padded to the position; and combine the padded and encoded field value with the determined pseudorandom sequence prior to combining with the first encoded data or combining the padded and encoded field value with the combined pseudorandom sequence and the first encoded data to produce the second encoded data.

14. The non-transitory computer-readable medium of claim 13, wherein the first field value is a value based on an address of the first location and the second field value is a value based on an address of the second location.

15. The non-transitory computer-readable medium of claim 9, wherein combining the first encoded data with the determined pseudorandom sequence to produce the second encoded data is performed by logic within the memory die.

16. A system comprising:
a memory device; and
a processing device, operatively coupled with the memory device, to:
combine a starting seed, which is associated with a first location in a first page of the memory device, with a destination seed, which is associated with a second location in a second page of the memory device, to produce a combined seed;
determine a pseudorandom sequence based on the combined seed and a pseudorandom sequence table, wherein the pseudorandom sequence table maps seed values to pseudorandom sequences and wherein the determined pseudorandom sequence maps to the combined seed in the pseudorandom sequence table;
combine the first encoded data with the determined pseudorandom sequence to produce second encoded data, wherein the first encoded data is scrambled based on the starting seed while, based on combining the first encoded data with the pseudorandom sequence, the second encoded data is scrambled based on the destination seed, wherein combining the first encoded data with the pseudorandom sequence to produce the second encoded data is performed by logic within the memory device; and store the second encoded data in the second location of the memory device.

17. The system of claim 16, wherein the processing device is further to:
determine a set of used bits amongst a set of seed bits that represent the seed values in the pseudorandom sequence table;
determine each permutation of values for the set of used bits while setting remaining bits in the set of seed bits to zero to produce a subset of seeds;
generate a pseudorandom sequence for each seed in the subset of seeds; and
generate the pseudorandom sequence table to map the subset of seeds to corresponding pseudorandom sequences.

18. The system of claim 17, wherein at least two bits in the set of used bits are non-contiguous in the set of seed bits such that an intervening bit, which is not part of the set of used bits, separates the at least two bits.

19. The system of claim 17, wherein a result of the combination of any pair of seeds in the subset of seeds is part of the subset of seeds.

20. The system of claim 16, wherein the processing device is further to:
determine that a first field value in the first encoded data is to be changed to a second field value based on the first encoded data moving from the first location to the second location;
combine the first field value with the second field value to produce a combined field value;
determine a padded and encoded field value based on the combined field value and a padding and encoding table, wherein the padding and encoding table maps field values to padded and encoded field values that each include (1) the a field value padded to a position that corresponds to a position of the first field value in the first encoded data and (2) parity bits for the field value padded to the position; and
combine the padded and encoded field value with the determined pseudorandom sequence prior to combining with the first encoded data or combining the padded and encoded field value with the combined pseudorandom sequence and the first encoded data to produce the second encoded data.

* * * * *